(12) United States Patent
Agarwal et al.

(10) Patent No.: US 12,153,816 B2
(45) Date of Patent: *Nov. 26, 2024

(54) ADAPTIVE CACHING FOR HYBRID COLUMNAR DATABASES WITH HETEROGENEOUS PAGE SIZES

(71) Applicant: SAP SE, Walldorf (DE)

(72) Inventors: Prateek Agarwal, Pune (IN); Simhachala Sasikanth Gottapu, Dublin, CA (US); Sarika Iyer, San Ramon, CA (US); Prasanta Ghosh, San Ramon, CA (US); Colin Florendo, Marlborough, MA (US)

(73) Assignee: SAP SE, Walldorf (DE)

( * ) Notice: Subject to any disclaimer, the term of this patent is extended or adjusted under 35 U.S.C. 154(b) by 134 days.

This patent is subject to a terminal disclaimer.

(21) Appl. No.: 17/944,610

(22) Filed: Sep. 14, 2022

(65) Prior Publication Data

US 2023/0011790 A1  Jan. 12, 2023

Related U.S. Application Data

(63) Continuation of application No. 17/328,656, filed on May 24, 2021, now Pat. No. 11,481,134.

(51) Int. Cl.
*G06F 3/06* (2006.01)

(52) U.S. Cl.
CPC .......... *G06F 3/0644* (2013.01); *G06F 3/0617* (2013.01); *G06F 3/0631* (2013.01); *G06F 3/0656* (2013.01); *G06F 3/0679* (2013.01)

(58) Field of Classification Search
CPC .... G06F 3/0644; G06F 3/0631; G06F 3/0656; G06F 3/0679
See application file for complete search history.

(56) References Cited

U.S. PATENT DOCUMENTS

| | | | | |
|---|---|---|---|---|
| 4,916,604 A | * | 4/1990 | Yamamoto | G06F 12/0857 711/E12.05 |
| 10,496,315 B1 | * | 12/2019 | Niu | G06F 3/0685 |
| 11,481,134 B1 | * | 10/2022 | Agarwal | G06F 12/123 |
| 11,645,198 B2 | * | 5/2023 | Li | G06F 13/1673 711/154 |
| 2004/0093442 A1 | * | 5/2004 | Furuya | G06F 13/385 711/111 |

(Continued)

*Primary Examiner* — Ramon A. Mercado
(74) *Attorney, Agent, or Firm* — Sterne, Kessler, Goldstein & Fox P.L.L.C.

(57) ABSTRACT

Disclosed herein are system, method, and computer program product embodiments for adaptive caching for hybrid columnar databases with heterogeneous page sizes. An embodiment operates by scanning one or more pools comprising one or more pages of the same size in a buffer cache. The embodiment determines an increment of a reuse rate for the pools in the buffer cache within a time interval. The embodiment determines a cumulative reuse rate that is the sum of the increments of the reuse rate over several time intervals. The embodiment determines a gliding average reuse rate of the cumulative reuse rate over several time intervals. The embodiment compares the average reuse rates of the plurality of the pools to a threshold to dynamically determine whether a pool should reuse memory from the existing pages of the same pool or rebalance memory from one or more victim pools.

20 Claims, 15 Drawing Sheets

(56) References Cited

U.S. PATENT DOCUMENTS

| | | | |
|---|---|---|---|
| 2006/0004958 A1* | 1/2006 | Takahashi | G06F 3/0676 |
| | | | 711/143 |
| 2009/0228676 A1* | 9/2009 | Naganuma | G06F 12/0866 |
| | | | 711/173 |
| 2010/0023685 A1* | 1/2010 | Ikejiri | G06F 3/0625 |
| | | | 713/320 |
| 2011/0066808 A1* | 3/2011 | Flynn | G06F 12/0246 |
| | | | 711/E12.001 |
| 2013/0073825 A1* | 3/2013 | Terayama | G06F 3/0646 |
| | | | 711/E12.002 |
| 2014/0029369 A1* | 1/2014 | Yamazaki | G06F 3/0659 |
| | | | 365/230.03 |
| 2016/0196063 A1* | 7/2016 | Chung | G06F 3/061 |
| | | | 711/103 |
| 2016/0350530 A1* | 12/2016 | Wang | G06F 21/78 |
| 2017/0090818 A1* | 3/2017 | Nitta | G06F 3/0683 |
| 2017/0185645 A1* | 6/2017 | Agarwal | G06F 16/24552 |
| 2018/0196755 A1* | 7/2018 | Kusuno | G06F 12/0893 |
| 2021/0240390 A1* | 8/2021 | Kim | G06F 3/0649 |

* cited by examiner

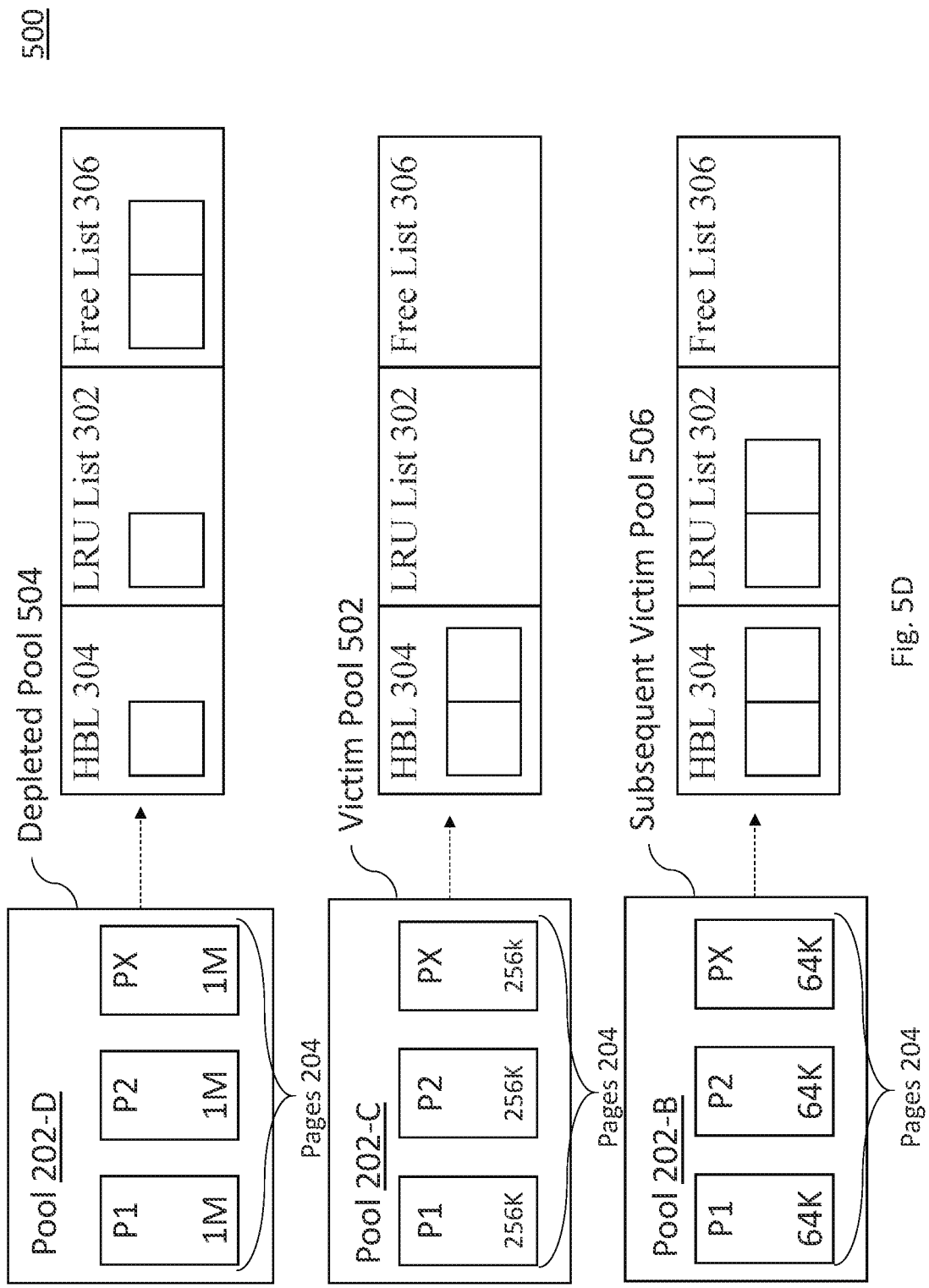

| Interval (Tn) 602 | 256K Pool Gliding Window of Reuse Rates (Px 604) | Increment of Reuse Rate 606 | Cumulative Reuse Rate 608 | Gliding Average Reuse Rate 610 |
|---|---|---|---|---|
| 0 | 0 0 0 0 0 0 0 0 0 0 | 0 | 0 | 0 |
| 1 | 0 0 0 0 0 0 0 0 0 8 | 8 | 8 | 8 |
| 2 | 0 0 0 0 0 0 0 0 8 99 | 99 | 107 | 53.5 |
| 3 | 0 0 0 0 0 0 0 8 99 98 | 98 | 205 | 68.3 |
| 4 | 0 0 0 0 0 0 8 99 98 7 | 7 | 212 | 53 |
| 5 | 0 0 0 0 0 8 99 98 7 102 | 102 | 314 | 62.8 |
| 6 | 0 0 0 0 8 99 98 7 102 54 | 54 | 368 | 61.3 |
| 7 | 0 0 0 8 99 98 7 102 54 10 | 10 | 378 | 54 |
| 8 | 0 0 8 99 98 7 102 54 10 39 | 39 | 417 | 52.1 |
| 9 | 0 8 99 98 7 102 54 10 39 35 | 35 | 452 | 50.2 |

Fig. 6A

| Interval (Tn) 602 | 1M Pool Gliding Window of Reuse Rates (Px 604) | Increment of Reuse Rate 606 | Cumulative Reuse Rate 608 | Gliding Average Reuse Rate 610 |
|---|---|---|---|---|
| 0 | 0 0 0 0 0 0 0 0 0 0 | 0 | 0 | 0 |
| 1 | 0 0 0 0 0 0 0 0 0 8 | 8 | 8 | 8 |
| 2 | 0 0 0 0 0 0 0 0 8 47 | 47 | 55 | 27.5 |
| 3 | 0 0 0 0 0 0 0 8 47 60 | 60 | 115 | 38.3 |
| 4 | 0 0 0 0 0 0 8 47 60 91 | 91 | 206 | 51.5 |
| 5 | 0 0 0 0 0 8 47 60 91 99 | 99 | 305 | 61 |
| 6 | 0 0 0 0 8 47 60 91 99 53 | 53 | 358 | 59.7 |
| 7 | 0 0 0 8 47 60 91 99 53 17 | 17 | 375 | 53.6 |
| 8 | 0 0 8 47 60 91 99 53 17 81 | 81 | 456 | 57 |
| 9 | 0 8 47 60 91 99 53 17 81 6 | 6 | 462 | 51.3 |

| Interval (Tn) 602 | 64K Pool Gliding Window of Reuse Rates (Px 604) | Increment of Reuse Rate 606 | Cumulative Reuse Rate 608 | Gliding Average Reuse Rate 610 |
|---|---|---|---|---|
| 0 | 0 0 0 0 0 0 0 0 0 0 | 0 | 0 | 0 |
| 1 | 0 0 0 0 0 0 0 0 0 5 | 5 | 5 | 5 |
| 2 | 0 0 0 0 0 0 0 0 5 18 | 18 | 23 | 11.5 |
| 3 | 0 0 0 0 0 0 0 5 18 26 | 26 | 49 | 16.3 |
| 4 | 0 0 0 0 0 0 5 18 26 84 | 84 | 133 | 33.25 |
| 5 | 0 0 0 0 0 5 18 26 84 99 | 99 | 232 | 46.4 |
| 6 | 0 0 0 0 5 18 26 84 99 57 | 57 | 289 | 48.2 |
| 7 | 0 0 0 5 18 26 84 99 57 67 | 67 | 356 | 50.9 |
| 8 | 0 0 5 18 26 84 99 57 67 59 | 59 | 415 | 51.9 |
| 9 | 0 5 18 26 84 99 57 67 59 43 | 43 | 458 | 50.9 |

| Interval (Tn) 602 | Average Reuse Rate (64K, Tn) 610 | Average Reuse Rate (256K, Tn) 610 | Average Reuse Rate (1M, Tn) 610 | Standard Deviation of Average Reuse Rate 702 | Mean of Average Reuse Rates 704 | Threshold 706 |
|---|---|---|---|---|---|---|
| 0 | 0 | 0 | 0 | 0 | 0 | 0 |
| 1 | 5 | 8 | 8 | 1.4 | 7 | 8.4 |
| 2 | 11.5 | 53.5 | 27.5 | 17.3 | 30.8 | 48.1 |
| 3 | 16.3 | 68.3 | 38.3 | 21.3 | 41 | 62.3 |
| 4 | 33.25 | 53 | 51.5 | 9.0 | 45.9 | 54.9 |
| 5 | 46.4 | 62.8 | 61 | 7.3 | 56.7 | 64.0 |
| 6 | 48.2 | 61.3 | 59.7 | 5.8 | 56.4 | 62.2 |
| 7 | 50.9 | 54 | 53.6 | 1.4 | 52.8 | 54.2 |
| 8 | 51.9 | 52.1 | 57 | 2.4 | 53.7 | 56.1 |
| 9 | 50.9 | 50.2 | 51.3 | 0.5 | 50.8 | 51.3 |

Fig. 7A

| Interval (Tn) 602 | Average Reuse Rate 610 (< or >) Threshold 706? (64K, Tn) | Average Reuse Rate 610 (< or >) Threshold 706? (256K, Tn) | Average Reuse Rate 610 (< or >) Threshold 706? (1M, Tn) | Reuse or Rebalance? |
|---|---|---|---|---|
| 0 | 0 | 0 | 0 | 0 |
| 1 | 5 < 8.4 | 8 < 8.4 | 8 < 8.4 | Reuse |
| 2 | 11.5 < 48.1 | 53.5 > 48.1 | 27.5 < 48.1 | Rebalance for $P_{256}$ |
| 3 | 16.3 < 62.3 | 68.3 > 62.3 | 38.3 < 62.3 | Rebalance for $P_{256}$ |
| 4 | 33.25 < 54.9 | 53 < 54.9 | 51.5 < 54.9 | Reuse |
| 5 | 46.4 < 64.0 | 62.8 < 64.0 | 61 < 64.0 | Reuse |
| 6 | 48.2 < 62.2 | 61.3 < 62.2 | 59.7 < 62.2 | Reuse |
| 7 | 50.9 < 54.2 | 54.0 < 54.2 | 53.6 < 54.2 | Reuse |
| 8 | 51.9 < 56.1 | 52.1 < 56.1 | 57 > 56.1 | Rebalance for $P_{1M}$ |
| 9 | 50.9 < 51.3 | 50.2 < 51.3 | 51.3 = 51.3 | Reuse |

Fig. 7B

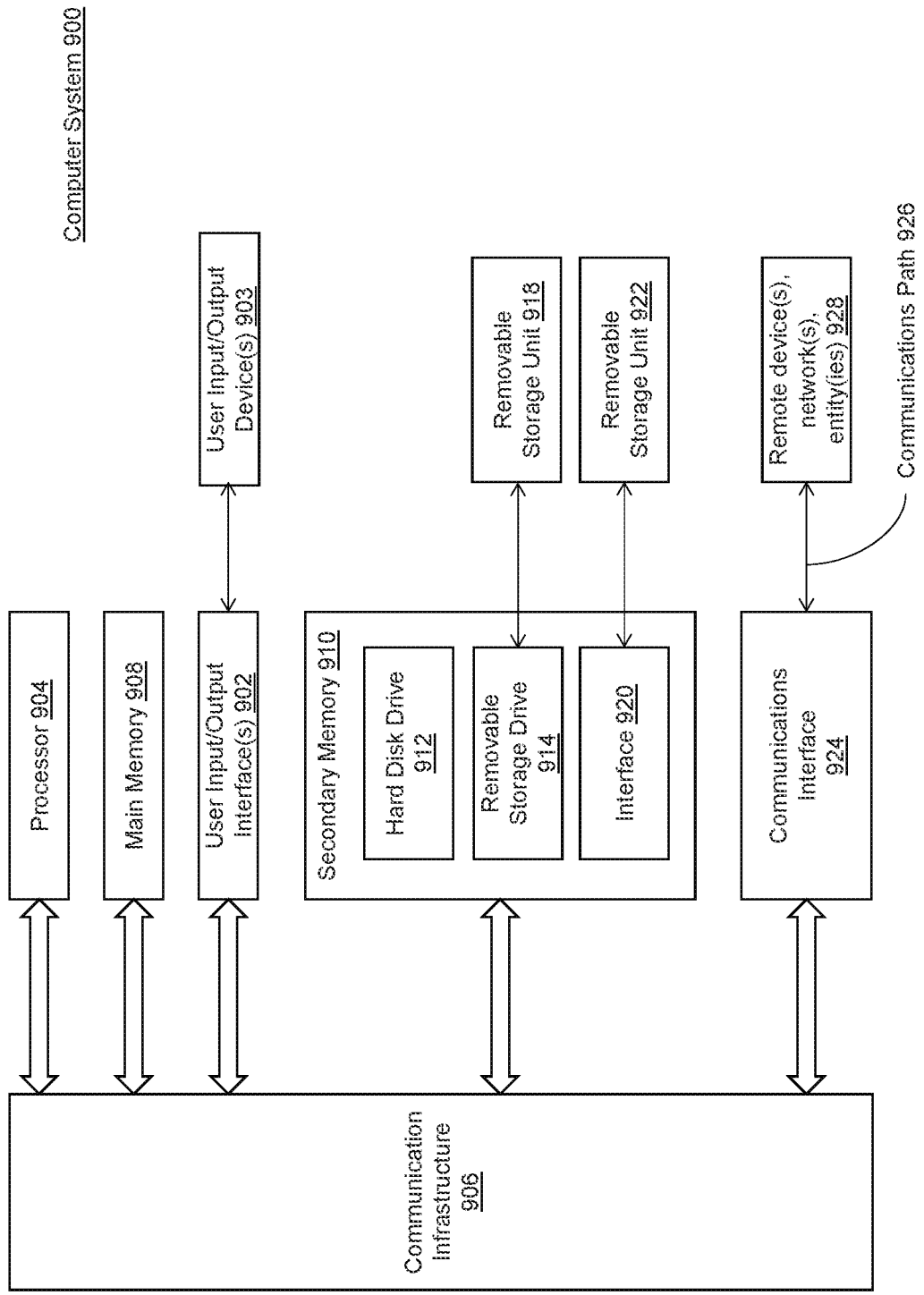

ADAPTIVE CACHING FOR HYBRID COLUMNAR DATABASES WITH HETEROGENEOUS PAGE SIZES

CROSS-REFERENCE TO RELATED APPLICATIONS

This application is a continuation of U.S. patent application Ser. No. 17/328,656, filed May 24, 2021, which is hereby incorporated by reference.

BACKGROUND

Columnar databases use heterogeneous page sizes to optimally store data. A buffer cache plays an important role in many columnar databases. With the use of heterogeneous page sizes, a buffer cache may need to support heterogeneous page sizes with the use of pools, in which each pool is a collection of pages of the same size. Columnar databases can employ various page caching mechanisms to manage and allocate memory.

In many databases, data is not accessed uniformly and memory is a premium resource. This may result in strict upper limits on cache size. Accordingly, a buffer cache may reuse memory from existing pages of a pool or rebalance memory from a different pool to grow the size of a buffer cache. While these various caching mechanisms are available, legacy caching mechanisms generally reuses memory from a pool in high-demand before considering rebalancing memory from other pools in a buffer cache.

BRIEF DESCRIPTION OF THE DRAWINGS

The accompanying drawings are incorporated herein and form a part of the specification.

FIG. 5C is a block diagram illustrating a system for rebalancing memory from more than one victim pool and FIG. 5D is a block diagram illustrating the memory layout of a pool after rebalancing memory from more than one victim pool, according to some embodiments.

FIGS. 6A-6C are tables illustrating a system for sampling statistics related to reuse cycles for pools in a buffer cache, according to some embodiments.

FIG. 7A is an example system for determining a threshold employed in a dynamic rebalancing approach, according to some embodiments.

FIG. 7B is an example system for employing a dynamic rebalancing approach, according to some embodiments.

FIG. 9 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for adaptive caching for hybrid columnar databases with heterogeneous page sizes. A buffer cache plays an important role in many columnar databases. A buffer cache manages heterogeneous page sizes with the use of pools. For example, a buffer cache maintains one pool per page size (i.e., 4 KB, 16 KB, 64 KB, 256 KB, 1 MB, 16 MB, etc.). A buffer cache generally provides free page memory for pages that need to be read from a disk. However, the buffer cache grows up to a configured capacity. Beyond this maximum capacity, the buffer cache reuses memory from existing pages of a pool or rebalances memory from a different pool in the buffer cache.

When the buffer cache has reached its capacity, legacy caching algorithms generally default to reusing memory from existing pages in a pool until the pool is too small or empty. If the buffer cache fails to find a free page, the buffer cache in legacy systems will rebalance memory from other pools only as a last resort to finding a free page. This approach is not always optimal because it ignores underutilized memory in other pools that can be used earlier in a reuse cycle. Therefore, a technological solution is needed to dynamically switch between reusing memory from existing pages of a pool or rebalancing from other pools based on past sampled statistics. This technological solution would allow the buffer cache to dynamically adapt its size by rebalancing memory from another pool in a buffer cache without waiting until the existing pool is empty or depleted from heavily reusing memory.

Figure 1:
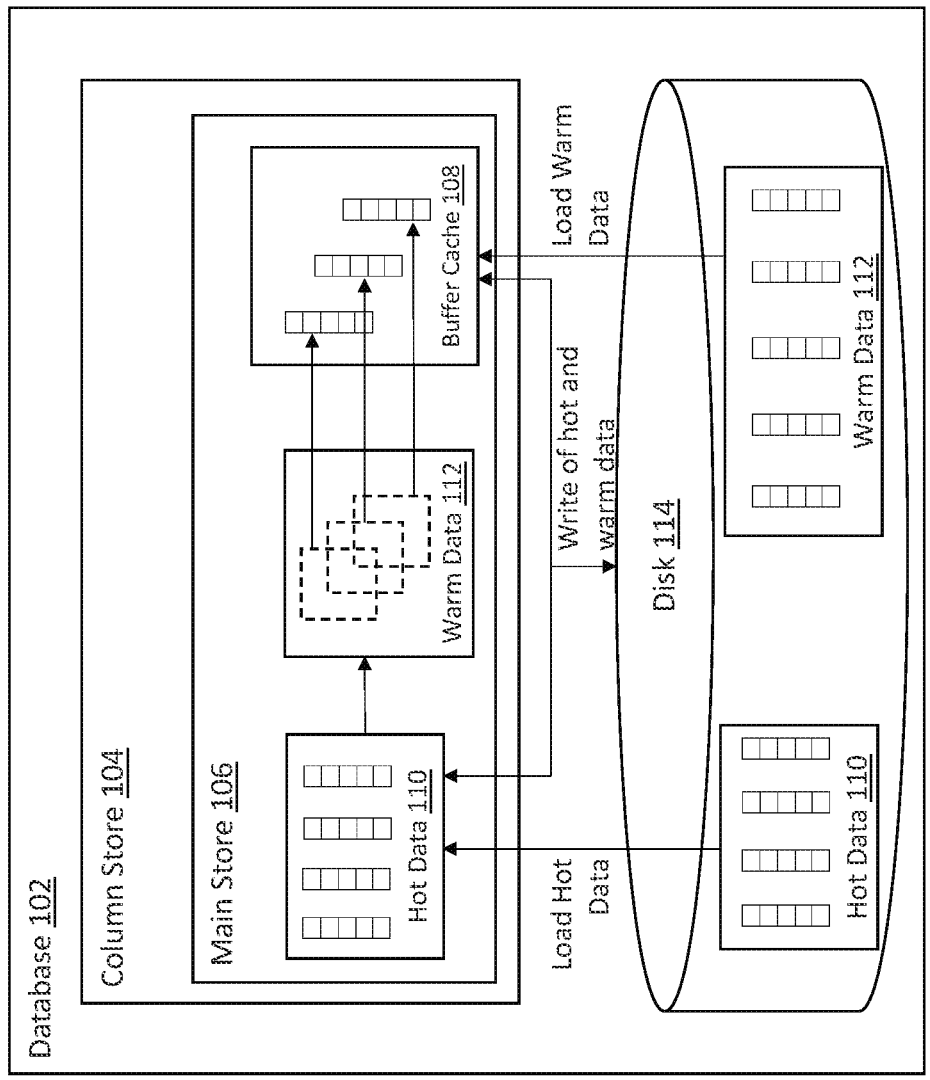
FIG. 1 is a block diagram illustrating a hybrid columnar database, according to some embodiments.

FIG. 1 is a block diagram illustrating a hybrid columnar database, according to some embodiments. Columnar databases aim to efficiently write and read data to and from a hard disk storage for efficient analytical query processing. Columnar databases generally enable managing less-frequently accessed data without fully loading data into memory. System 100 includes a database 102, a column store 104, a main store 106 with a buffer cache 108, and a disk 114.

The database 102 may comprise a column store 104 and a row store (not shown). Column store 104 stores data tables by column. Within the column store 104, there may be a main store 106. The main store 106 may comprise the data stored in the main memory of the database 102. The database 102 also comprises a persistent layer or disk 114. The disk 114 may be used for handling operational and transactional data for secure backup or restoration of data in the case of data corruption or a database crash. The disk 114 may also enable read and write of data operations via storage interfaces.

The database 102 manages multi-temperature data such as hot data 110 and warm data 112. Hot data 110 may be critical data for real-time processing and analytics and may comprise a column loadable table. Hot data 110 includes data that is frequently accessed. Hot data 110 may be located in disk 114 for high performance. According to some embodiments, hot data 110 may reside entirely in main store 106. The system 100 may load hot data 110 from disk 114 to main store 106 for fast processing and analytics. Warm data 112 may be used to store read-only data that may not need to be accessed frequently. The warm data 112 may be stored in the disk 114. The database 102 may distribute warm data 112 partially in main store 106 and partially in disk 114.

The main store 106 comprises a buffer cache 108. The buffer cache 108 supports buffer requests for different page sizes. Each buffer in the buffer cache 108 comprises a control block and a page. The buffer cache 108 may provide page memory from dynamically managed memory pools. The system 100 may load warm data 112 from the disk 114 into the buffer cache 108. This allows system 100 to retain warm data 112 intelligently by finding pages in-memory rather than finding pages in the disk 114. This may improve the system 100's performance because page reads from memory, such as buffer cache 108, may be faster than reading pages from the disk 114. In some embodiments, hot data 110 is no longer frequently accessed. Accordingly, the hot data 110 may be converted to warm data 112. The system 100 may store converted warm data 112 in the buffer cache 108.

Figure 2:
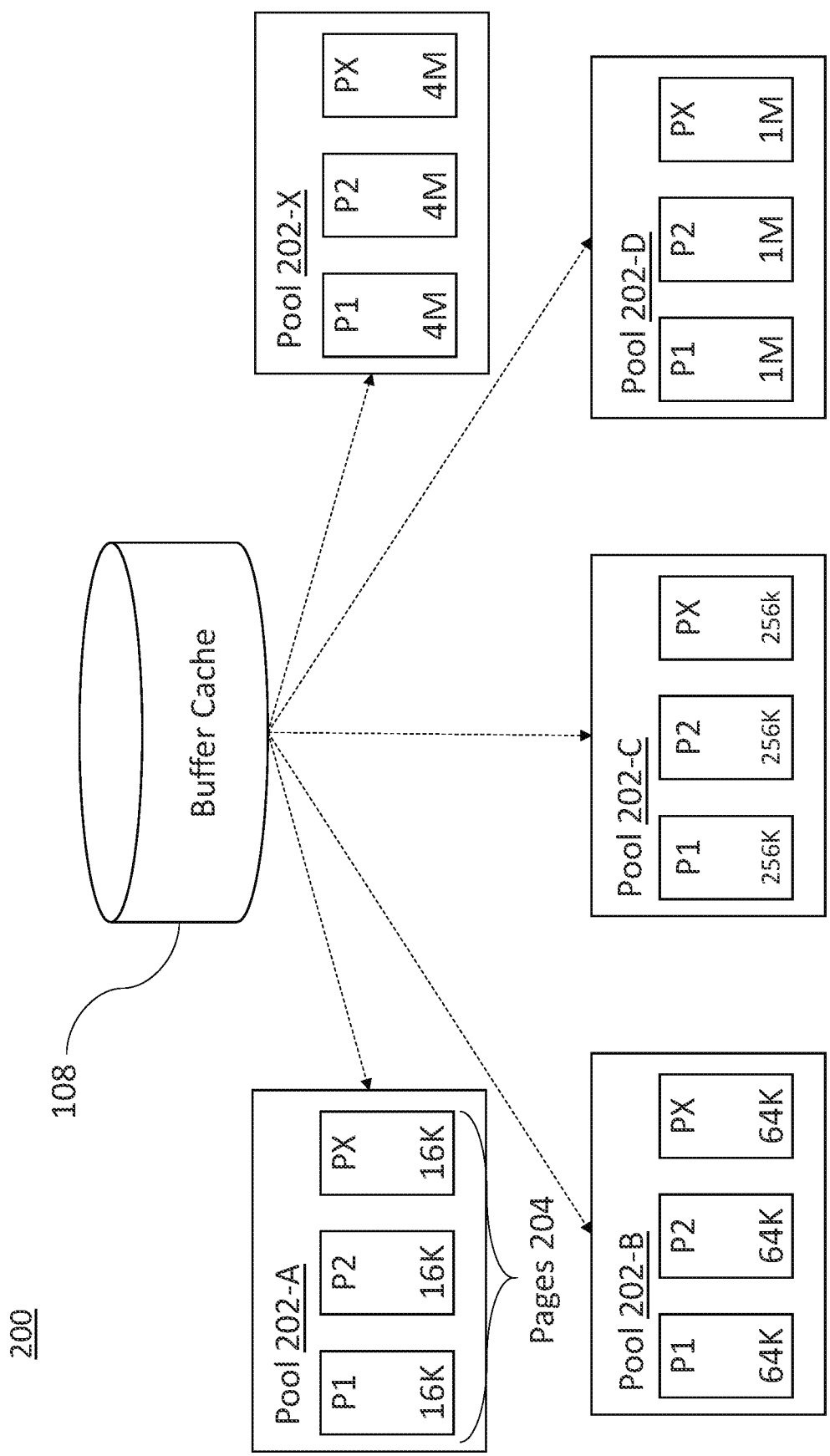
FIG. 2 is a block diagram illustrating a system for pools in a buffer cache with heterogeneous page sizes, according to some embodiments.

FIG. 2 is a block diagram illustrating a system for pools in a buffer cache with heterogeneous page sizes, according to some embodiments. FIG. 2 is described with reference to FIG. 1. The buffer cache 108 may contain one or more containers (108-A, 108-B, 108-C, . . . , 108-X, . . . ). Each container may divide memory into pools 202 (202-A, 202-B, 202-C, . . . , 202-X . . . ). Pools 202 can be pre-allocated memory space with a fixed size. The system 100 may use pools 202 for memory management by dynamically allocating memory from a designated memory region. Each pool 202 may comprise pages 204. In some embodiments, pages 204 can store a fixed-length contiguous block of memory (e.g., virtual memory) in a columnar format. Pages 204 can have a predefined amount of storage capacity (e.g., 256 KB).

The buffer cache 108 may be empty when the server starts. The pools 202 may grow with each use. The buffer cache 108 may maintain one pool 202 per page size (e.g., 4 KB, 16 KB, 64 KB, 256 KB, 16 MB, etc.). Each pool 202 comprises one or more pages 204 of the same page size, according to some embodiments. For example, as shown in FIG. 1, pool 202-A comprises one or more pages 204 (e.g., P1, P2, . . . , PX) with the page size 16 KB, pool 202-B comprises one or more pages 204 (e.g., P1, P2, . . . , PX) with the page size 64 KB, and pool 202-X comprises one or more pages 204 (e.g., P1, P2, . . . , PX) with the page size 4 MB, etc.

Figure 3:
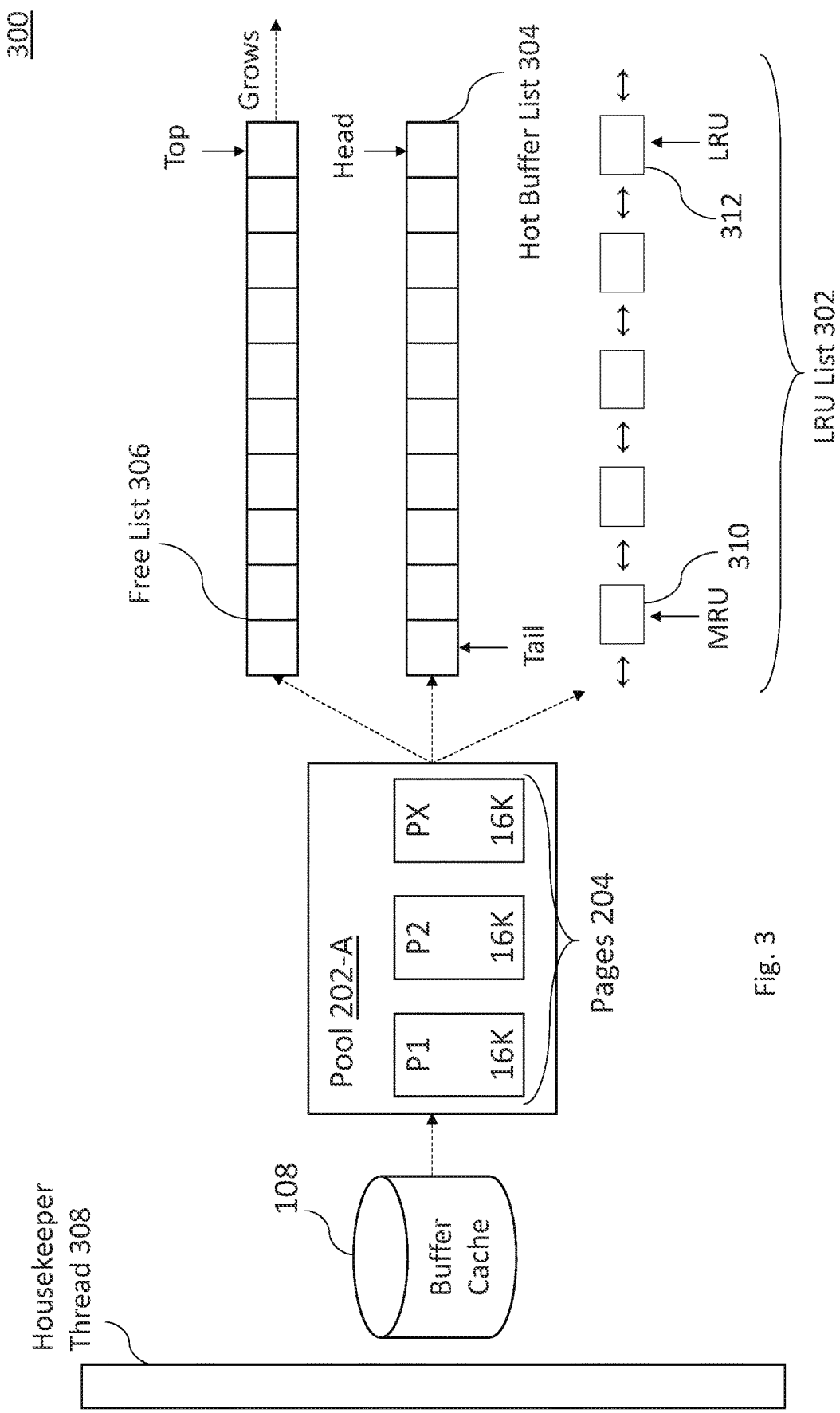
FIG. 3 is a block diagram illustrating a system for the memory layout of a pool in a buffer cache, according to some embodiments.

FIG. 3 is a block diagram of a system illustrating a memory layout of a pool in a buffer cache, according to some embodiments. FIG. 3 is described with reference to FIG. 1 and FIG. 2. Each pool 202 in the buffer cache 108 of the system 100 comprises a Least Recently Used List ("LRU List") 302, a Free List 306, and a Hot Buffer List ("HBL") 304.

The LRU list 302 comprises a list of pages 204 based on how recently the one or more pages 204 were accessed. The LRU List 302 may generally store warm data 112. According to one embodiment, the LRU List 302 may be implemented with a doubly linked list. When a page 204 is read into memory, the most recently used (MRU) page 310 may be stored as the leftmost node of the LRU List 302 and the least recently used page 312 will be stored as the rightmost node of the LRM List 302, as shown in FIG. 3. In another embodiment, the LRU List 302 may be implemented in a hash table with the pages 204 serving as the keys.

The LRU List 302 enables the buffer cache 108 to intelligently determine which page 204 is the oldest buffer or the least recently used page 312. The least recently used page 312 may be a good candidate to be removed when a new page 204 will need to be added and an existing page 204 must be removed to reuse memory.

The Free List 306 may be an empty container. The Free List 306 generally includes pre-allocated pages 204. Pre-allocated pages 204 may generally be included to prevent accessing a memory manager for allocation. The Free List 306 may retain memory for destroyed or unloaded pages 204 reserved for future use. Database pages 204 may be loaded into the Free List 306 once a query accesses pages 204 and tries to read the pages 204 from the disk 114 into memory. Once the pages 204 are loaded into memory, these pages 204 may no longer be free and the buffer cache 108 may move these pages 204 into the Least Recently Used List 302, according to some embodiments.

The Hot Buffer List 304 may be a list of pages filtered based on the frequency of access to pages 204. Frequently accessed data may be considered hot data 110. Accordingly, the Hot Buffer List 306 may comprise hot data 110. However, the Hot Buffer List 304 may grow in its size over a period of time, whereas not all the data contained within the Hot Buffer List 304 will continue to be hot or frequently accessed. Accordingly, hot data 110 that is cooled down because it is no longer frequently accessed may need to be moved to the Least Recently Used List 302 or Free List 306.

The system 100 comprises a housekeeper thread 308 for a first purpose of tracking and sampling statistics to determine whether the buffer cache 108 should reuse or rebalance memory. According to some embodiments, the housekeeper thread 308 maintains event-based counters for each pool 202. The housekeeper thread 308 may maintain an event-based counter for each instance the buffer cache 108 reuses memory from existing pages 204 of a pool 202. The housekeeper thread 308 samples values of memory reuse within each pool 202 at several time intervals, according to some embodiments. For example, the housekeeper thread 308 may determine and maintain an increment of a reuse rate, according to some embodiments. The increment of a reuse rate may be a counter of the frequency memory was reused in a pool during a time interval.

The housekeeper thread 308 may also maintain event-based counters at the pool level when a page 204 is requested from disk 114. The request rate may be the average number of page requests per second for a given pool 202. If the request rate is N pages, then the housekeeper thread 308 may move N pages 204 from the Hot Buffer List 304 to the Least Recently Used List 302 of the same pool 202, according to some embodiments.

The housekeeper thread 308 may also fulfill a second purpose, according to some embodiments. The housekeeper thread 308 may move pages between the Hot Buffer List 304 and the Least Recently Used List 302 of a pool 202. The Hot Buffer List 304 may be a list of pages 204 filtered based on the frequency of access to pages 204. On the other hand, the Least Recently Used List 302 may be a list of pages 204 filtered based on how recently pages have been accessed. If pages 204 in the Least Recently Used List 302 are accessed frequently, this may be considered hot data 110 in the buffer cache 108. Threads servicing a particular query may move pages from the LRU List 302 into the Hot Buffer List 304. In some embodiments, the housekeeper thread 308 may also move hot data 110 from the Least Recently Used List 302 to the Hot Buffer List 304.

The Hot Buffer List 304 may grow in its size over a period of time, whereas not all the data contained within the Hot Buffer List 304 will continue to be hot or frequently accessed. Accordingly, the task of moving data out of the Hot Buffer List 304 may not be performed by threads servicing a particular query because using these threads may slow down system time. This task may be offloaded to the housekeeper thread 308. When pages 204 are no longer frequently used or when the buffer cache 108 needs to reclaim memory, the housekeeper thread may 308 move the data from the Hot Buffer list 304 to the Least Recently Used List 302 or Free List 306.

Figure 4:
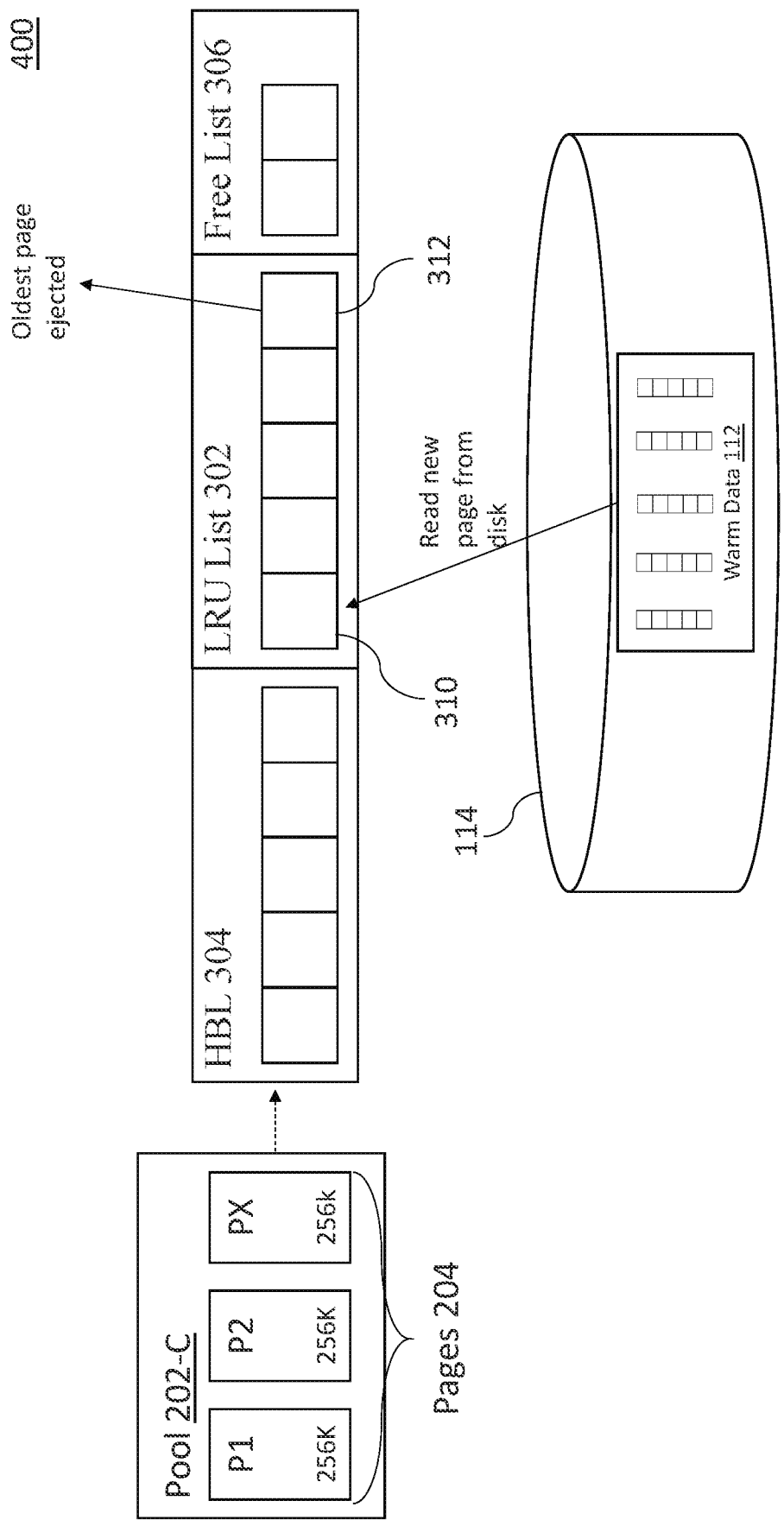
FIG. 4 is a block diagram illustrating a system for reusing memory of an existing page in a pool of a buffer cache, according to some embodiments.

FIG. 4 is a block diagram illustrating a system for reusing memory of an existing page in a pool of a buffer cache, according to some embodiments. FIG. 4 is described with reference to FIG. 1, FIG. 2, and FIG. 3. Initially when the system 100 starts, the buffer cache 108 is empty and grows up to a configurable limit. For example, the system 100 may set the size of the buffer cache 108 to MAX_SIZE. When a page 204 is loaded from the disk 114 to the buffer cache 108, the memory of the page 204 will be allocated to the Free List 306 or the LRU List 302. As system 100 continues to allocate memory to the Free List 306 or the LRU List 302, the system 100 may eventually reach a configurable limit. The system 100 may not be able to allocate memory exceeding the MAX_SIZE value. Once the buffer cache 108 has reached its capacity and the buffer cache 108 has to allocate or read a page 204 from the disk 114, the buffer cache 108 can free memory by reusing the memory of an existing page 204 of pool 202.

Accordingly, the buffer cache 108 may need to intelligently evict pages 204. To reuse memory, the memory for the least recently used page 312 of the Least Recently Used List 302 is reused to read a page 204 from the disk 114. Generally, the least recently used page 312 is potentially the optimal page 204 to eject because the least recently used page 312 may be the least likely to be re-accessed. The least recently used page 312 may then be evicted to the Free List 306. The buffer cache 108 then reads the new page 204 from the disk 114 into the LRU List 302. The new page 204 is designated the most recently used page 310 in the Least Recently Used List 302. According to some embodiments, in cases where the Least Recently Used List 302 is very small or empty, the buffer cache 108 may evict a page from the Hot Buffer List 304 and read the new page 204 into the Hot Buffer List 304.

As an example, as shown in FIG. 4, the buffer cache 108 may allocate memory to Free List 306 or LRU List 302 until further memory cannot be allocated to the buffer cache 108. Once the size of the buffer cache 108 has reached a configurable limit and the buffer cache 108 needs to read memory to pool 202-C from disk 114, the oldest or least recently used page 312 of the LRU List 302 is ejected. The buffer cache 108 then reads the new page 204 from the disk 114 into the LRU List 302 and is designated the most recently used page 310 at the head of the Least Recently Used List 302 in pool 202-C.

While reusing memory allows the buffer cache 108 to intelligently allocate memory, reusing memory may sometimes be ineffective in small pools. Ejected pages would need to be read from the disk 114 in a cycle, which may significantly slow down queries. Legacy systems will generally reuse memory until a pool is empty or small, in which case the system will rebalance memory from a different pool. However, reusing memory until the pool is empty may not allow the buffer cache 108 to intelligently and efficiently allocate memory from underutilized pools to overutilized pools earlier in a reuse cycle.

Figure 5A:
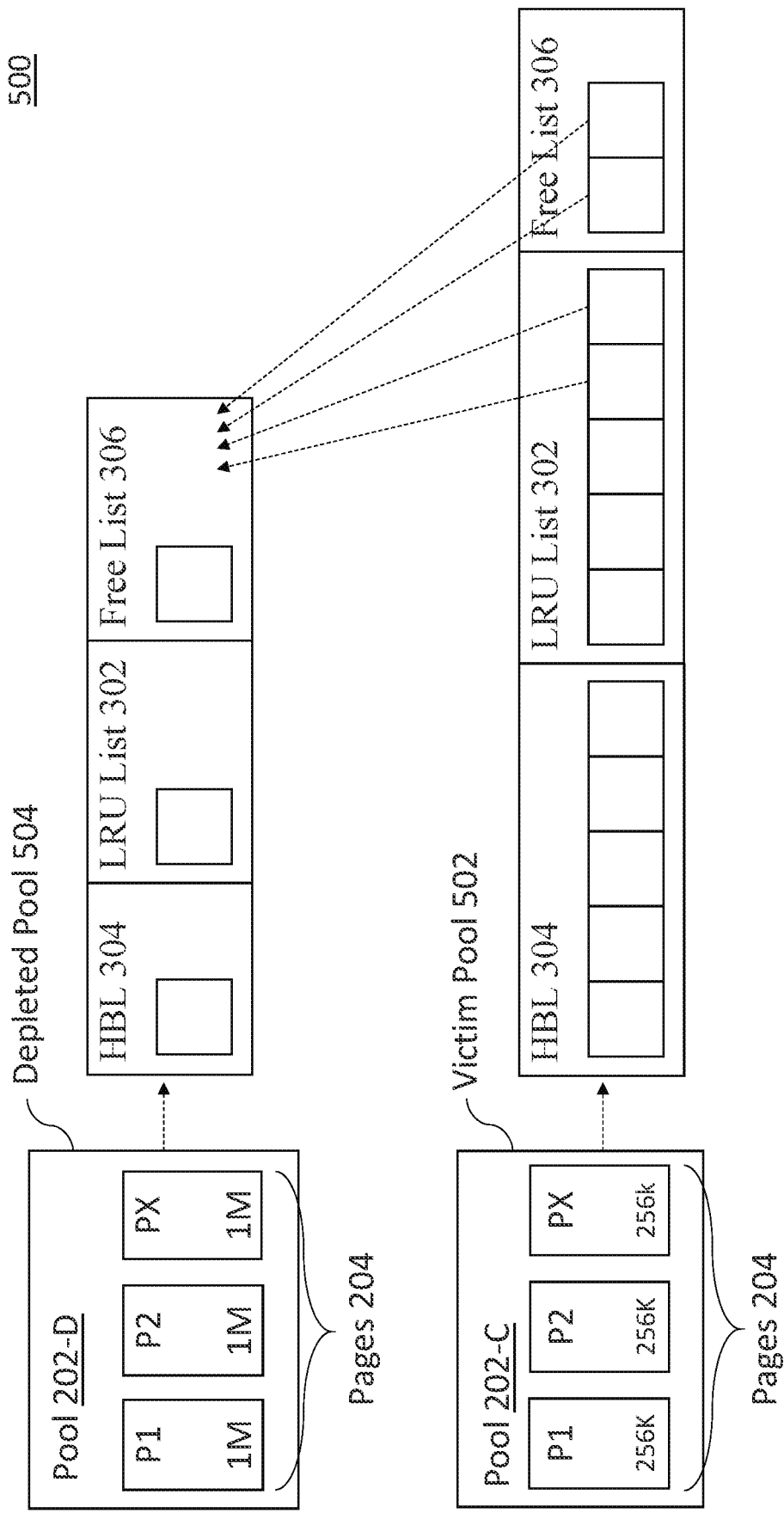
FIG. 5A is a block diagram illustrating a system for rebalancing memory from a victim pool and FIG. 5B is a block diagram illustrating the memory layout of a pool after rebalancing memory from a victim pool, according to some embodiments.
Figure 5B:
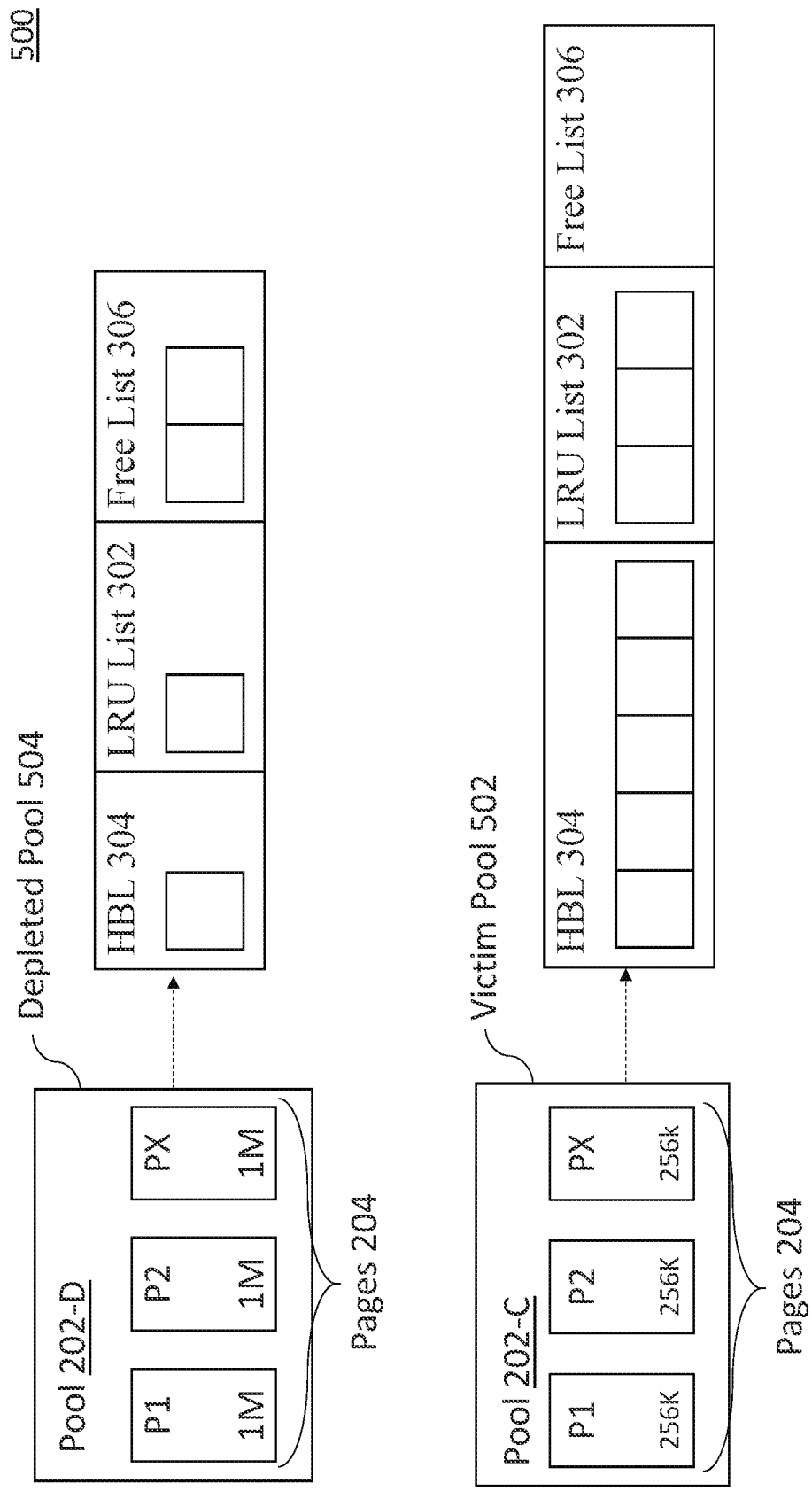

FIG. 5A is a block diagram illustrating a system for rebalancing memory from a victim pool and FIG. 5B is a block diagram illustrating the memory layout of a pool after rebalancing memory, according to some embodiments. FIG. 5 is described with reference to FIG. 1, FIG. 2, FIG. 3, and FIG. 4. In addition to reusing memory from existing pages 204 in the same pool 202, as described in FIG. 4, the buffer cache 108 can rebalance memory from a victim pool 502 to a depleted pool 504. According to some embodiments, the victim pool 502 is the pool from which memory is allocated to a depleted pool 502 that can no longer grow and heavily reuses memory from existing pages 204 of the same pool 202. Rebalancing may generally occur in the context of small pools 202 when large number of pages 204 are referenced at the same time in a small pool 202.

Each pool 202 may have different classes of memory, i.e., the Free List 306, the LRU List 302, and the Hot Buffer List 304. To rebalance memory, the buffer cache 108 may evict a page 204 from the Free List 306 of the victim pool 502 to the Free List 306 or LRU List 302 of the depleted pool 504. The buffer cache 108 may continue to allocate a page 204 from the victim pool 502 to the depleted pool 504 from the Free List 306 until the Free List 306 of victim pool 502 is empty. Once the Free List 306 is empty, the buffer cache 108 may allocate the least recently used page 312 from the LRU list 302 of the victim pool 502. The buffer cache 108 may continue to allocate the least recently used page 312 from the LRU list 302 until the LRU list 302 is empty. In some embodiments, the buffer cache 108 may allocate memory from the LRU List 302 of the victim pool 502 to the depleted pool 504 before allocating memory from the Free List 306. In other embodiments, the buffer cache 108 may allocate memory only to the LRU List 302 of the depleted pool 504.

The buffer cache 108 generally releases one-page worth of memory from the victim pool 502 when rebalancing memory. However, the buffer cache 108 may require more than one page worth of memory of the depleted pool 504 from a victim pool 502. Accordingly, the system 100 may determine how many pages worth of memory in the depleted pool 504 needs to be rebalanced from one or more victim pools 502. The system 100 may multiply the number of pages required for depleted pool 504 and the size of the depleted pool 504. The system 100 may divide this value from the size of the victim pool 502 to determine the number of pages 204 that need to be rebalanced from the victim pool 502 to the depleted pool 504. The system 100 may determine how many pages 204 need to be rebalanced from the victim pool 502 to the depleted pool 504 based on the following formula:

$$\# \text{ of Pages to be Rebalanced from Victim Pool} = \frac{\# \text{ of Pages Required for Depleted Pool} * \text{Size of Pages in Depleted Pool}}{\text{Size of Pages in Victim Pool}}$$

For example, as shown in FIG. 5A, pool 202-D containing pages 204 with 1 MB of memory is the depleted pool 504 and pool 202-C containing pages with 256 KB of memory is the victim pool 502. To rebalance 1 MB of memory, the system 100 may release four pages of 256K memory from pool 202-C, the victim pool 502, to pool 202-D, the depleted pool 504. In order to rebalance four pages of 256K memory, the system 100 may allocate memory from the Free List 306 because it is not loaded memory. In this case, two pages 204 from the Free List 306 (e.g., 512 KB pages of memory) from pool 202-C may be allocated to the Free List 306 in pool 202-D. However, two more pages 204 (e.g., 512 KB pages of memory) will still need to be allocated in order to rebalance 1 MB of memory from pool 202-C to pool 202-D. Accordingly, the buffer cache 108 may allocate two pages 204 (e.g., two 256K pages of memory) from the LRU List 302 of pool 202-C to the Free List 306 or LRU List 302 of the pool 202-D.

Accordingly, the buffer cache 108 allocates two pages 204 of memory from the Free List 306 and two pages from the LRU List 302 of pool 202-C, the victim pool 502, was allocated to the Free List 306 of pool 202-D, the depleted pool 504. As shown in FIG. 5B, once these four pages 204 have been allocated to the depleted pool 504, the buffer cache 108 has rebalanced 1 MB of memory to the depleted pool 504.

Figure 5C:
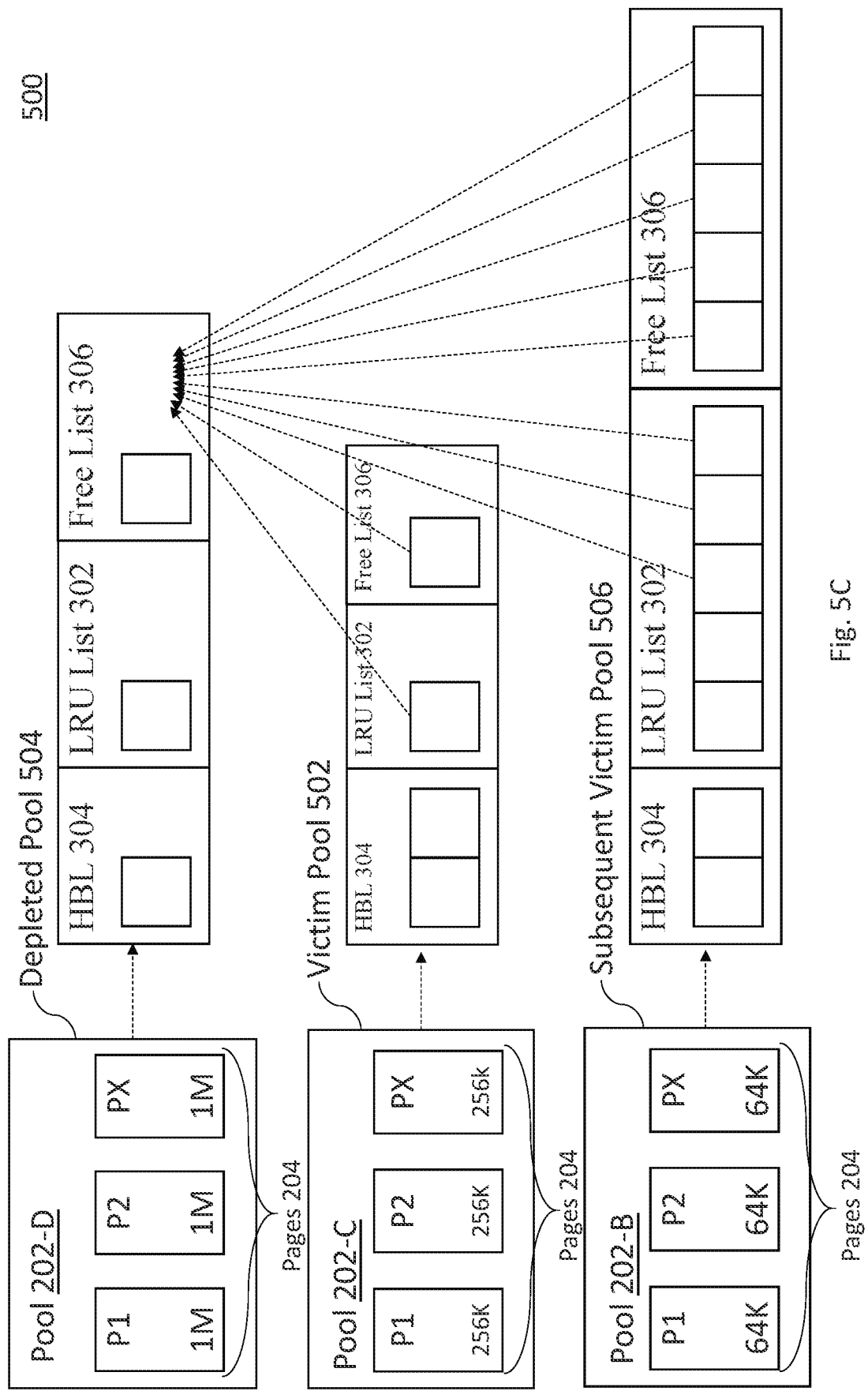

FIG. 5C is a block diagram illustrating a system for rebalancing memory from more than one victim pool and FIG. 5D is a block diagram illustrating the memory layout of a pool after rebalancing memory from more than one victim pool, according to some embodiments. As shown in FIG. 5A and FIG. 5B, when the buffer cache 108 can no longer grow by reusing memory from an existing pool 202, the buffer cache 108 can rebalance memory from a victim pool 502 to a depleted pool 504. However, in some embodiments, the system 100 may need to continue to rebalance memory from subsequent victim pools 506 after rebalancing memory from a first victim pool 502 for various reasons. For example, the system 100 may rebalance memory from a subsequent victim pool 506 if the size of the first victim pool 502 is empty or too small to rebalance memory. In another embodiment, the system 100 may rebalance memory from a subsequent victim pool 506 if the number of pages 204 rebalanced to the depleted pool 504 has reached a page rebalance upper limit 508 (not shown).

Accordingly, the system 100 may determine a page rebalance upper limit 508, which may be a limit on how many pages 204 should be rebalanced from a victim pool 502. Without an upper limit on how many pages 204 are rebalanced, the buffer cache 108 may continue to remove pages 204 from a Least Recently Used List 302 of a victim pool 502 until the victim pool 502 is heavily depleted. Therefore, the system 100 may place a page rebalance upper limit 508 on the number of pages 204 rebalanced from the victim pool 502 to the depleted pool 504. The system 100 may rebalance memory from a subsequent victim pool 506 if the number of pages 204 that were rebalanced from the first victim pool 502 has reached the page rebalance upper limit 508.

According to one embodiment, the page rebalance upper limit 508 can be determined by first calculating the least common multiple of the page size in the victim pool 502 and the page size in the depleted pool 504. The page size in the victim pool 502 can then be divided from the least common multiple of the page size in the victim pool 502 and the page size in the depleted pool 504. The page rebalance upper limit 508 can be determined using the following formula:

$$\text{Page Rebalance Upper Limit} = \frac{LCM(\text{Page Size of Victim Pool}, \text{Page Size of Depleted Pool})}{\text{Page Size of Victim Pool}}$$

The buffer cache 108 may continue to rebalance memory from subsequent victim pools 506 until memory is rebalanced to the depleted pool 504. For example, as shown in FIG. 5C, pool 202-D containing pages 204 with 1 MB of memory is the depleted pool 504 and pool 202-C containing pages 204 with 256 KB of memory is the victim pool 502. To rebalance this memory, the system 100 would need to release four pages of 256 KB memory from pool 202-C, the victim pool, to pool 202-D, the depleted pool. However, the Free List 306 and the LRU List 302 are too small to rebalance four 256 KB pages 204 from pool 202-C. Therefore, the system 100 can rebalance one 256 KB page 204 from the Free List 306 of the pool 202-C to pool 202-D. At that point, the Free List 306 of pool 202-C will be empty. The system 100 may then rebalance memory from the LRU List 302 of pool 202-C to the Free List 306 of pool 202-D. According to some embodiments, the system 100 may rebalance memory from the LRU List 302 or Free List 306 of pool 202-C to the LRU List 302 of pool 202-D. After rebalancing these two pages 204 (e.g., 512 KB pages worth of memory), pool 202-C may be too small to rebalance the remaining 512 KB pages worth of memory to pool 202-D.

In this case, further rebalancing may be required to increase the size of the depleted pool 504. Accordingly, the buffer cache 108 then moves to subsequent victim pools 506 to rebalance memory. In this case, the buffer cache 108 will rebalance memory from pool 202-B containing pages with 64 KB of memory. To rebalance the remaining 1 MB of memory (e.g., 512 KB pages of memory) from pool 202-B, the subsequent victim pool 506, to the depleted pool 504, the buffer cache 108 will need to release eight 64 KB pages 204 of memory.

Therefore, after rebalancing, two 256K pages 204 from pool 202-C, the buffer cache 108 may first rebalance from the Free List 306 of the subsequent victim pool 506. In this case, the buffer cache 108 may rebalance the five 64K pages in the Free List 306 to the Free List of pool 202-D. Once the Free List 306 of the subsequent victim pool 506 is empty, the buffer cache 108 may then rebalance three 64K pages from the LRU List 302 to the depleted pool 504. As shown in FIG. 5D, once the two pages 204 from the first victim pool 502 (e.g., two 256 KB pages worth 512 KB of memory) and the eight pages from the subsequent victim pool 506 (e.g., eight 64 KB pages worth 512 KB of memory) have been allocated to the Free List 306 of the depleted pool 504, the buffer cache 108 has rebalanced 1 MB of memory to the depleted pool 504.

In some embodiments, when the buffer cache 108 has rebalanced memory from a subsequent victim pool 506 and the depleted pool 504 requires further memory, the buffer cache 108 will continue to rebalance from subsequent victim pools 506 until the memory of the depleted pool 504 has been rebalanced.

FIG. 6A is a table illustrating a system for sampling statistics related to reuse cycles for sampled pools in a buffer cache, according to some embodiments. FIG. 6 is described with reference to FIG. 1, FIG. 2, FIG. 3, FIG. 4 and FIG. 5. Generally, legacy systems continue to reuse memory of existing pages from a pool when a new page needs to be added to the buffer cache and only rebalances memory from other pools when one pool is faced with extreme memory pressure. With the early caching mechanisms, rebalancing memory was generally the last step in finding a free page and would not be exercised in a reuse cycle. This approach overlooks many pools that may be underutilized for memory management early on in a reuse cycle. To address this situation, a dynamic rebalancing approach can be employed in which rebalancing memory can be used to find a free page from other pools during and throughout existing reuse cycles.

A dynamic rebalancing approach can be implemented by sampling reuse rates for each pool 202 over multiple time intervals. This approach may be used to detect whether one pool 202 is under significant reuse, and thereby, increases the pool 202's size to adapt to increased memory demand. The system 100 employs housekeeper thread 308 to update statistics related to reuse cycles and samples reuse rates for each pool 202. The housekeeper thread 308 may calculate an increment of reuse rate 606, which is designated as $DR(P_x, T_n)$. Housekeeper thread 308 may observe the increment of the reuse rate 608 during the sampling of time intervals $T_{n-1}$ and $T_n$. The increment of reuse rate 606 may be the value of how many pages 204 were reused for a particular pool $P_x$ 604 between a particular time stamp or time interval $T_n$ 602 and the previous interval $T_{n-1}$ the housekeeper thread 308 sampled. In some embodiments, the pools $P_x$ 604 are the number of pools 202 the housekeeper thread 308 sampled within a time interval $T_n$ 602.

The housekeeper thread 308 may also calculate a cumulative reuse rate 608, which is designated as $R(P_x, T_n)$. The cumulative reuse rate 608 may be the cumulative frequency of pages 204 that were reused within a reuse cycle over several time intervals $T_n$ 602. According to some embodiments, the cumulative reuse rate 608 may be calculated based on the following formula:

$$R(Px, Tn) = DR(Px, Tn) + DR(Px, Tn-1) + \ldots + DR(Px, Tn-k)$$

Based on the increment of the reuse rate 606 for each sampling time interval 602, the housekeeper thread 308 may calculate a gliding average reuse rate 610 for the last k samples of a particular pool $P_x$ 604 at a time interval $T_n$ 602. The housekeeper thread 308 may calculate the gliding average reuse rate 610 based on the following formula:

$$AverageReuseRate(P_x, T_n) = \frac{DR(Px, Tn) + DR(Px, Tn-1) + \ldots + DR(Px, Tn-k)}{k}$$

According to some embodiments, $T_n - T_{n-1}$ is the fixed sampling interval within the buffer cache 108.

According to another embodiment, the housekeeper thread 308 may determine the gliding average reuse rate 610 by dividing the cumulative reuse rate 608 of the current time interval $T_n$ 602 for a particular pool $P_x$ 604 and dividing the reuse rate 606 from the last k samples. The gliding average reuse rate 610 may be based on the following formula:

$$AverageReuseRate(P_x, T_n) = \frac{R(Px, Tn)}{k}$$

The housekeeper thread 308 may update these periodic statistics based on the increment of the reuse rate 606, cumulative reuse rate 608, and the gliding average reuse rate 610 after each time interval $T_n$ 602. The housekeeper thread 308 may sample any statistics related to reuse cycles known to a person of ordinary skill in the art.

As an example, housekeeper thread 308 updates statistics related to reuse cycles and samples reuse rates for a pool 202 (e.g., 202-C) containing pages 204 with 256 KB memory. In this case, the housekeeper thread 308 calculates and maintains the value of the increment of the reuse rate 606 $R(P_x, T_n)$ for pool 202, where $P_x$ 604 is pool 202-C containing pages 204 with 256 KB for $T_n$ time intervals 602. As shown in FIG. 6A, the buffer cache 108 samples the reuse cycles for pool 202-C with page sizes of 256 KB for nine time intervals $T_n$ 602. In the first time interval 602, $T_1$, the housekeeper thread 308 scans pool 202-C and determines the increment of the reuse rate 606 for pool 202-C at the first time interval 602. In the first time interval $T_n$ 602, therefore, the increment of the reuse rate 606 is $DR(P_{256}, T_1) = 8$. Because this is the first time interval $T_n$ 602 for which the housekeeper thread 308 sampled statistics related to the existing reuse cycle, the cumulative reuse rate 608 and gliding average reuse rate 610 are also a value of 8.

The housekeeper thread 308 may continue to sample statistics for pool 202 for several time intervals $T_n$ 602. In the second time interval $T_n$ 602, $T_2$, the housekeeper thread 308 again scans pool 202-C and determines the increment of the reuse rate 606 value for pool 202-C at the second time interval. In the second time interval $T_n$ 602, therefore, the increment of the reuse rate 606 is $DR(P_{256}, T_2) = 99$. In other words, the pool 202-C has reused 99 pages 204 of memory between the first time interval and the second time interval.

In addition to determining the increment of the reuse rate 606 for $R(P_{256}, T_n)$, the housekeeper thread 308 may determine the cumulative reuse rate 608 for each time interval $T_n$ 602 based on the following formula $R(P_x, T_n) = DR(P_x, T_n) + DR(P_x, T_{n-1}) + \ldots + DR(P_x, T_{n-k})$. Using the increments of the reuse rate 606 from the first two time intervals 602, the housekeeper thread 308 calculates the sum of $DR(P_{256}, T_1) = 8$ and $DR(P_{256}, T_2) = 99$. Therefore, the cumulative reuse rate 608 for pool 202-C at interval $T_2$ is $DR(P_{256}, T_2) = DR(P_{256}, T_1) + R(P_{256}, T_2) = 8 + 99 = 107$.

Upon determining the increment of the reuse rate 606 and cumulative reuse rate 608 for pool 202-C, the housekeeper thread 308 may determine the average reuse rate 610 for the last k samples based on the following formula: $AverageReuseRate(P_x, T_n) = DR(P_x, T_n) + DR(P_x, T_{n-1}) + \ldots + DR(P_x, T_{n-k})/k$. In this case, k is designated a value of 2 because housekeeper thread 308 scanned pool 202-C for two time intervals 602 to determine the increment of the reuse rate 606 and the cumulative reuse rate 608. In this case, the increment of the reuse rate 606 for pool 202-C at the second time interval 602 is $DR(P_x, T_n) = DR(P_{256}, T_2) = 99$ and the increment of the reuse rate 608 for pool 202-C at the first time interval 602 $DR(P_x, T_{n-1}) = DR(P_{256}, T_1) = 8$. Using the two increments of the reuse rates 606 the housekeeper thread 308 has calculated thus far, the housekeeper thread 308 sums these two values and divides k, the number of intervals sampled by the housekeeper thread 308. Therefore, the average reuse rate 610 for pool 202-C at the second time interval $T_n$ 602 is $AverageReuseRate(P_{256}, T_2) = DR(P_{256}, T_2) + DR(P_{256}, T_1)/k = (8+99)/2 = 53.5$.

In other embodiments, the housekeeper thread 308 may also determine the average reuse rate 610 based on the following formula: $AverageReuseRate(P_x, T_n) = R(P_x, T_n)/k$. In this case, the cumulative reuse rate 608 for the second time interval $T_n$ 602 is $R(P_{256}, T_2) = 107$ and k is designated a value of 2 because housekeeper thread 308 scanned pool 202-C for two time intervals 602 to determine the cumulative reuse rate 606. Therefore, the average reuse rate 610 using the following formula is $AverageReuseRate(P_{256}, T_2) = R(P_{236}, T_2)/2 = 53.5$.

The housekeeper thread 308 continues to sample statistics such as the increment of the reuse rate 606, the cumulative reuse rate 608, and the gliding average reuse rate 610 over several time intervals 602. In this example, the housekeeper thread 308 continues to sample these statistics for nine time intervals 602. Moreover, each pool 202 has a housekeeper thread 308. Therefore, housekeeper thread 308 may sample these statistics for each pool 202. As shown in FIGS. 6B and 6C, the housekeeper thread 308 sampled reuse cycle statistics for pool 202-D containing pages 204 with 1 MB for $T_n$ time intervals 602, pool 202-B containing pages 204 with 64

KB for $T_n$ time intervals 602, and the other pools 202 (not shown) in the buffer cache 108 for $T_n$ time intervals 602.

FIG. 7A is an example system for determining a threshold employed in a dynamic rebalancing approach, according to some embodiments. Generally, legacy systems reuses memory for small and non-empty pools instead of increasing the size of the pool by rebalancing memory from other pools earlier in a reuse cycle. Accordingly, there is a need for pools to benefit from dynamically rebalancing memory without delaying this option until a pool is empty. The housekeeper thread 308 utilizes the system described in FIG. 6 to periodically sample reuse events to measure statistics related to reuse rates. Generally, when all pools 202 are equally facing memory pressure, employing the dynamic rebalancing algorithm may not be beneficial and the buffer cache 108 may instead reuse memory. To determine whether the buffer cache 108 should rebalance memory from a victim pool 502, the housekeeper thread 308 compares the average reuse rates 610 from all the pools 202.

To compare the average reuse rate 610 of a pool $P_x$ 604 to one or more other pools $P_x$ 604, the housekeeper thread 308 may compute a standard deviation of the average reuse rates 702 on the gliding average reuse rate 610 compared with all the pools $P_x$ 604 for each time interval $T_n$ 602. By calculating a standard deviation of the average reuse rates 702, the housekeeper thread 308 may determine which pool $P_x$ 604 is an outlier or heavily depleted from reusing memory compared to other pools $P_x$ 604 in the buffer cache 108.

The housekeeper thread 308 may also calculate a mean of the average reuse rates 704, which is the sum of each average reuse rate 610 for each pool $P_x$ 604 in the buffer cache 108 that the housekeeper thread 308 sampled for each time interval $T_n$ 602 divided by the number of pools the housekeeper thread 308 sampled. For a given pool $P_x$ 604, the housekeeper thread 308 determines whether memory should be reused or rebalanced by comparing the average reuse rates 610 to a threshold 706. The threshold 706 may be pre-determined or configurable, according to some embodiments. In other embodiments, the threshold may be the sum of the mean of the average reuse rates 704 and the standard deviation of the average reuse rates 702. In some embodiments, the threshold may incorporate a margin of error to the sum of the mean of the average reuse rates 704 and the standard deviation of the average reuse rates 702.

As an example, based on the average reuse rates 610 in FIG. 6A, FIG. 6B, and FIG. 6C, the housekeeper thread 308 determines the standard deviation of the average reuse rates 704 for pool 202-B, pool 202-C, and pool 202-D is 1.4. The housekeeper thread 308 also determines the mean of the average reuse rates 704 is the sum of the average reuse rates 610 of pool 202-B, pool 202-C, and pool 202-D divided by the number of pools $P_x$ 604 sampled. In this case the sum of the average reuse rates 610 of pool 202-B (e.g., 5), pool 202-C (e.g., 8), and pool 202-D (e.g., 8) is 21 and the number of pools $P_x$ 604 the housekeeper thread 308 sampled within the first time interval $T_1$ is three. Therefore, the mean of the average reuse rates 704 is the sum of the average reuse rates 610 (e.g., 21) divided by the number of pools $P_x$ 604 sampled (e.g., 3), which yields a value of 7.

Using the sum of the standard deviation of the average reuse rates 702 and the mean of the average reuse rates 704 for a time interval $T_n$ 602, the housekeeper thread 308 may determine a threshold to compare the pools in the dynamic rebalancing approach. In this case, the sum of the standard deviation of the average reuse rates 702 and mean of the average reuse rates 704 for pool 202-B, pool 202-C, and pool 202-D in the first time interval $T_1$ yields a value of 8.4.

Therefore, the housekeeper thread 308 can use this threshold 706 value of 8.4 to compare the average reuse rate 610 of other pools $P_x$ 604. However, the threshold 706 may also be pre-determined or configurable.

The housekeeper thread 308 continues to determine the standard deviation of the average reuse rate 702, the mean of the average reuse rates 704 and the threshold 706 for each time interval $T_n$. In this example, the housekeeper thread 308 continues to determine these statistics over nine time intervals 602. By determining a threshold 706, the housekeeper thread 308 can use statistics related to reuse cycles to dynamically determine whether the buffer cache 108 should reuse memory from a pool $P_x$ 604 or rebalance memory from a victim pool 502.

FIG. 7B is an example system for employing a dynamic rebalancing algorithm, according to some embodiments. In some embodiments, where a pool $P_x$ 604 has a similar average reuse rate 610 within the standard deviation of the average reuse rates 704, a pool $P_x$ 604 may not need to rebalance memory from a victim pool 502 by employing the dynamic rebalancing algorithm. To determine whether a particular pool $P_x$ 604 is a depleted pool 504 that needs to rebalance memory from a victim pool 502, the housekeeper thread 308 compares the average reuse rate 610 of each pool $P_x$ 604 sampled to the threshold 706.

Accordingly, if the average reuse rate 610 for a given pool $P_x$ 604 is less than the threshold 706, then the pool $P_x$ 604 may reuse memory from one or more pages 204 of that same pool $P_x$ 604. This may indicate that the pool $P_x$ 604 is not heavily depleted or overutilized. In other embodiments, if the average reuse rate 610 for a given pool $P_x$ 604 is greater than the threshold 706, then the particular pool 604 may be a depleted pool 504 and the buffer cache 108 may dynamically rebalance memory from a victim pool 502 to the depleted pool 504. In some embodiments, the victim pool 502 is the pool 202 with the minimum value of the average reuse rate 610.

As an example, to determine whether a pool $P_x$ 604 should reuse or rebalance memory, housekeeper thread 308 compares the average reuse rates 610 of each pool $P_x$ 604 sampled to a threshold 706. In this case, the housekeeper thread 308 compares the average reuse rates 610 of pool 202-B with 64 KB page size, pool 202-C with 256 KB page size, and pool 202-D with 1 MB page size to the threshold 706. For the purpose of illustration, the threshold 706 is the sum of the standard deviation of the average reuse rates 702 and the mean of the average reuse rates 704 for each time interval $T_n$ 602. However, the threshold 706 may be configurable to a different value.

In the first time interval $T_n$ 602, as discussed in FIG. 7A, the housekeeper thread 308 determines the threshold yields a value of 8.4, as the sum of the standard deviation of the average reuse rate 702 (e.g., 1.4) and the mean of the average reuse rates 704 (e.g., 7) for the pools $P_x$ 604 sampled in first time interval $T_1$. The housekeeper thread 308 then compares each average reuse rate 610 of each pool $P_x$ 604 sampled to the threshold 706. In this case, the average reuse rate 610 for pool 202-B (e.g., 5), pool 202-C (e.g., 8), and pool 202-D (e.g., 8) in the first time interval are less than the threshold value of 8.4. This indicates that the pools generally have similar average reuse rates. Therefore, the buffer cache 108 may reuse memory from existing pages 204 of each pool $P_x$ 604 sampled.

In the second interval, the housekeeper thread 308 determines the threshold yields a value of 48.1. The housekeeper thread 308 then compares each average reuse rate 610 of each pool $P_x$ 604 sampled to the threshold 706. In this case, the average reuse rate 610 for pool 202-B (e.g., 11.5) and pool 202-D (e.g., 27.5) are less than the threshold value of 48.1. However, the average reuse rate 610 for pool 202-C is 53.5, which exceeds the threshold value of 48.1. Therefore, pool 202-C is the depleted pool 504 and rebalances memory from a victim pool 502. The victim pool 504 may be the pool with the minimum average reuse rate 610. In this case, pool 202-B has the minimum average reuse rate 610 of 11.5 as opposed to pool 202-D, which has an average reuse rate of 27.5. Therefore, pool 202-B with 64 KB page sizes will be the victim pool 502.

Generally, the rebalance operation releases one page worth of memory in the depleted pool 504 from its victim pool 502. However, the rebalance operation can require more than one page worth of memory. For purposes of illustration, pool 202-C requires one page 204 of 256 KB memory. Therefore, because the 256 k pool 202-C requires memory from the victim pool 504 (e.g., pool 202-B with 64 KB pages of memory), four pages of 64 KB memory will be required to rebalance 256 KB of memory. Accordingly, the buffer cache 108 may rebalance four 64 KB pages 204 from pool 202-B to pool 202-C.

However, if more memory is required and pool 202-C can no longer rebalance further memory, the buffer cache 108 can move to a subsequent victim pool 506 to rebalance memory. For purposes of illustration, if there was not enough memory in pool 202-B to rebalance four 64 KB pages to pool 202-C, the buffer cache 108 can move to a subsequent victim pool 506 with the minimum average reuse rate 610. In this case, pool 202-D with 1M pages of memory has the next minimum average reuse rate 610. The buffer cache 108 may release the necessary required pages 204 from the pool 202-D to rebalance memory to pool 202-C. Once the memory has rebalanced, the pool 202-C with 256K pages has grown to match the demand of memory and accordingly will not need further rebalancing for the current interval.

In the third time interval 602, the housekeeper thread 308 determines the threshold 706 is 62.3. The housekeeper thread 308 again compares each average reuse rate 610 of each pool $P_x$ 604 sampled to the threshold 706 for the third time interval. In this case, the average reuse rate 610 for pool 202-B (e.g., 16.3) and pool 202-D (e.g., 38.3) are less than the threshold value of 62.3. However, the average reuse rate 610 for pool 202-C is 68.3, which exceeds the threshold value of 62.3. Therefore, pool 202-C is the depleted pool 504 and the buffer cache 108 rebalances the memory from a victim pool 502.

In this case, pool 202-B again has the minimum average reuse rate of 16.3 as opposed to pool 202-D, which has an average reuse rate of 38.3. Therefore, pool 202-B with 64 KB page sizes will be the victim pool 502. As discussed above, the buffer cache 108 will determine how many pages of memory is needed to rebalance memory to the depleted pool 502. The buffer cache 108 can rebalance four 64 KB pages of memory to rebalance 256 KB memory in pool 202-C and can rebalance memory from a subsequent victim pool 506 if more pages of memory needs to be rebalanced to depleted pool 504.

The housekeeper thread 308 continues to compare the average reuse rate 610 to the threshold 706 of that time interval $T_n$ 602. In the time intervals $T_4$-$T_7$, the housekeeper thread 308 determines average reuse rates 610 for the pools $P_x$ 604 sampled are less than the threshold value of the given time interval $T_n$ 602. Therefore, each of the sampled pools $P_x$ 604 will continue to reuse memory from its own pool. In time interval $T_8$, the housekeeper thread 308 determines the average reuse rate 610 for pool 202-D is greater than the threshold 706. Therefore, pool 202-D is the depleted pool 504 and the buffer cache 108 rebalances the memory from a victim pool 502. In this case, the victim pool 505 is pool 202-B because it yields an average reuse rate of 50.9. The buffer cache 108 may rebalance sixteen 64 KB pages to rebalance 1 MB of memory and rebalance memory from a subsequent victim pool 506 if needed.

In the final time interval $T_9$, the housekeeper thread 308 determines the average reuse rate 610 for pool 202-D is equal to the threshold. In this case, because the average reuse rate 610 is equal to the threshold 706, this may indicate that pool 202-D is equally stressed compared to other pools $P_x$ 604 sampled. Accordingly, pool 202-D may reuse memory of pages 204 from its own pool. However, in other embodiments, if the average reuse rate 610 equaling the threshold 706 indicates pool $P_x$ 604 is depleted, the buffer cache 108 may rebalance memory from a victim pool 502 to pool $P_x$ 604.

Figure 8:
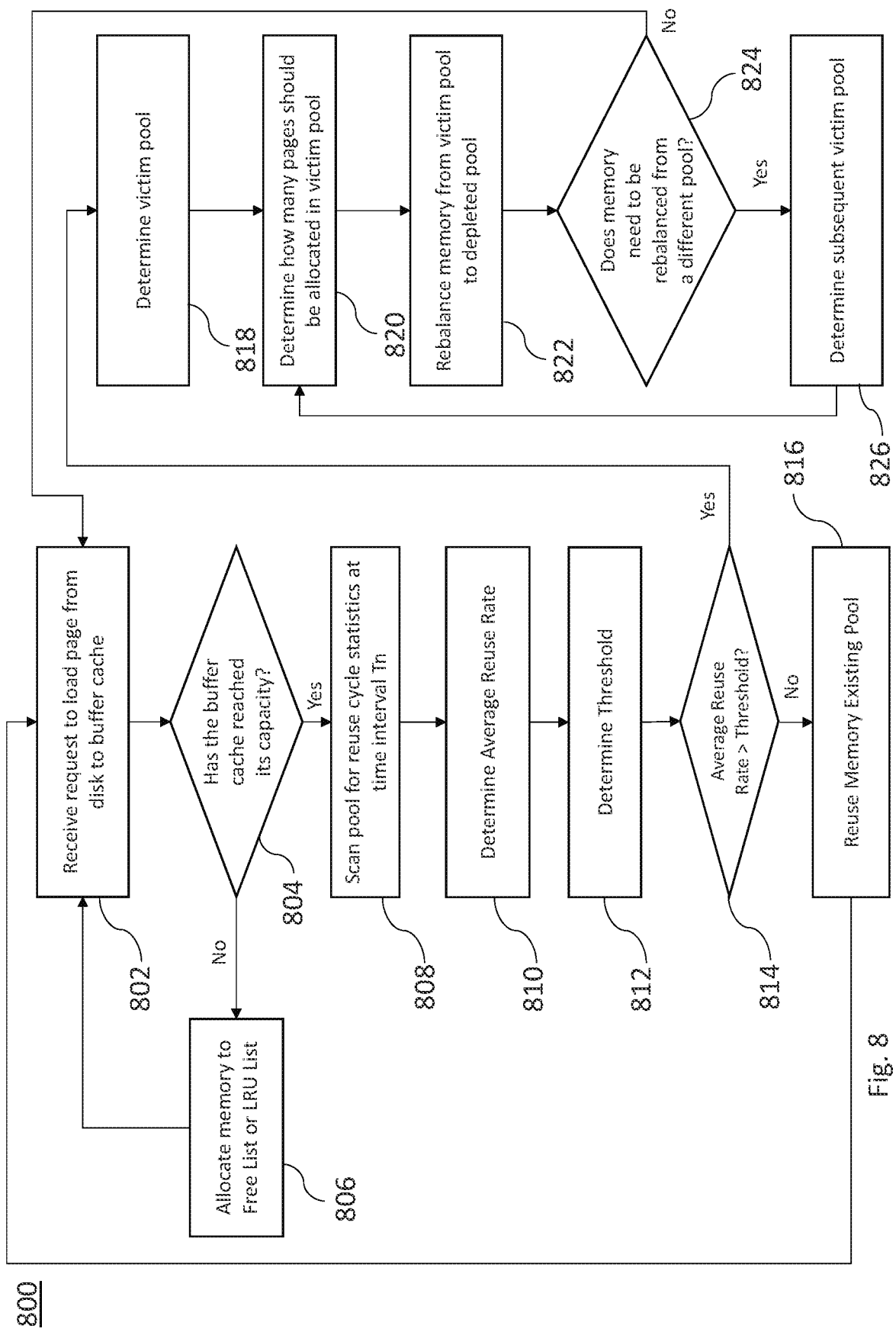
FIG. 8 is a flowchart illustrating a method for adaptive caching in hybrid columnar databases with heterogeneous page sizes, according to some embodiments.

FIG. 8 is a flowchart illustrating a method for adaptive caching for hybrid columnar databases with heterogeneous page sizes, according to some embodiments. FIG. 8 is described with reference to FIGS. 1-7. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

At 802, the system 100 receives a request to load a page 204 from the disk 114 to the buffer cache 108. Initially when the system 100 starts, the buffer cache 108 is empty and grows up to a configurable limit. The system 100 may set the size of the buffer cache 108 to MAX_SIZE. The system 100 may not be able to allocate memory exceeding the MAX_SIZE value. Once the buffer cache 108 has reached its capacity and the buffer cache 108 receives a request to load a page 204 from the disk 114, a pool 202 can free memory by reusing an existing page 204's memory from the same pool 202 or rebalancing memory from a victim pool 502.

At 804, the system 100 determines whether the buffer cache 108 has reached its capacity. If the buffer cache 108 has not reached its capacity, the method 800 proceeds to 806 to allocate memory to the Free List 306 or the LRU List 302. If the buffer cache 108 has reached its capacity, the method 800 proceeds to 808 to dynamically determine whether the buffer cache 108 should reuse memory from a page 204 of the same pool 202 or rebalance memory from a victim pool 502.

At 806, the system 100 allocates the memory of the requested page 202 to the Free List 306 or the LRU List 304. When a page 202 is loaded from the disk to the buffer cache 108, the memory of the page 204 will be allocated to the Free List 306 or the LRU List 302. According to some embodiments, the system 100 may allocate memory to the Hot Buffer List 304.

At 808, the system 100 uses housekeeper thread 308 to scan pool $P_x$ 604 to determine an average reuse rate 610 at a particular interval $T_n$ 602. The housekeeper thread 308 may scan one or more pools $P_x$ 604 in the buffer cache 108 to determine whether to reuse memory of an existing page 204 from the same pool $P_x$ 604 or rebalance memory from a victim pool 502 to a depleted pool 504. The housekeeper thread 308 updates and samples statistics related to reuse cycles for each pool $P_x$ 604 at various time intervals $T_n$ 602. Each pool 202 may have a housekeeper thread 308. Therefore, housekeeper thread may sample these statistics for each pool 202. In other embodiments, the housekeeper thread 308 may monitor statistics related to reuse cycles for the pools 202 that have reused pages at least once.

The housekeeper thread 308 may calculate an increment of reuse rate 606, which is designated as $DR(P_x, T_n)$. Housekeeper thread 308 may observe the increment of the reuse rate 606 during the sampling of time intervals $T_{n-1}$ and $T_n$. The increment of reuse rate 606 may be the value of how many pages were reused for a particular pool $P_x$ 604 between a particular time stamp or time interval $T_n$ 602 and the previous interval $T_{n-1}$ the housekeeper thread 308 sampled.

The housekeeper thread 308 may also calculate a cumulative reuse rate 608, which is designated as $R(P_x, T_n)$. The cumulative reuse rate 608 may be the cumulative frequency of pages 204 that were reused within a reuse cycle over several time intervals 602 in a pool $P_x$ 604. According to some embodiments, the cumulative reuse rate 608 may be calculated based on the following formula:

$$R(Px,Tn)=DR(Px,Tn)+DR(Px,Tn-1)+ \ldots +DR(Px,Tn-k)$$

The housekeeper thread 308 updates these periodic statistics based on the increment of the reuse rate 606, cumulative reuse rate 608, and gliding average of the reuse rate 610 after each time interval $T_n$ 602. The housekeeper thread 308 may sample any statistics related to reuse cycles known to a person of ordinary skill in the art.

At 810, the housekeeper thread 308 calculates an average reuse rate 610 for each sampled pool $P_x$ 604 at a particular time interval $T_n$ 602. Based on the increment of the reuse rate 606 for each sampling time interval 602, the housekeeper thread 308 may calculate a gliding average reuse rate 610 for the last k samples of a particular pool $P_x$ 604 at a time interval $T_n$ 602. The housekeeper thread 308 may calculate the gliding average reuse rate 610 based on the following formula:

$$AverageReuseRate(P_x, T_n) = \frac{DR(Px, Tn) + DR(Px, Tn-1) + \ldots + DR(Px, Tn-k)}{k}$$

According to some embodiments, $T_n - T_{n-1}$ is the fixed sampling interval within the buffer cache 108.

According to another embodiment, the housekeeper thread 308 may determine the gliding average reuse rate 610 by dividing the cumulative reuse rate 608 of the current time interval $T_n$ 602 for a particular pool $P_x$ 604 and dividing the reuse rate 606 from the last k samples. The gliding average reuse rate 610 may be based on the following formula:

$$AverageReuseRate(P_x, T_n) = \frac{R(Px, Tn)}{k}$$

The housekeeper thread 308 updates these periodic statistics based on the increment of the reuse rate 606, cumulative reuse rate 608, and the gliding average reuse rate 610 after each time interval $T_n$ 602. The housekeeper thread 308 continues to sample these statistics several time intervals $T_n$ 602.

At 812, the system 100 determines a threshold 706 to determine whether the particular pool $P_x$ 604 is a depleted pool 504 compared to other sampled pools $P_x$ 604. For a given pool $P_x$ 604, the housekeeper thread 308 determines whether memory should be reused or rebalanced by comparing the average reuse rates 610 to a threshold 706. The threshold 706 may be pre-determined or configurable, according to some embodiments. In other embodiments, the threshold may be sum of the mean of the average reuse rates 704 and the standard deviation of the average reuse rates 702.

In another embodiment, to compare the average reuse rate 610 of a pool $P_x$ 604 to one or more other pools $P_x$ 604, the housekeeper thread 308 may compute a standard deviation of the average reuse rates 702 on the gliding average reuse rate 610 compared with all the pools $P_x$ 604 for each time interval $T_n$ 602. The housekeeper thread 308 may also calculate a mean of the average reuse rates 704, which is the sum of each average reuse rate 610 for each sampled pool $P_x$ 604 in the buffer cache 108 that the housekeeper thread 308 sampled for each time interval $T_n$ 602 divided by the number of pools $P_x$ 604 the housekeeper thread 308 sampled. The threshold 706 may be the sum of the mean of the average reuse rates 704 and the standard deviation of the average reuse rates 702. In some embodiments, the threshold may incorporate a margin of error to the sum of the mean of the average reuse rates 704 and the standard deviation of the average reuse rates 702.

Using the sum of the standard deviation of the average reuse rates 702 and the mean of the average reuse rates 704 for a time interval $T_n$ 602, the housekeeper thread 308 may determine a threshold 706 to compare the pools in the dynamic rebalancing approach. The housekeeper thread 308 continues to determine the standard deviation of the average reuse rate 702, the mean of the average reuse rates 704, and the threshold 706 for each time interval $T_n$ 602.

At 814, the housekeeper thread 308 compares the average reuse rates 610 of each pool $P_x$ 604 to the threshold 706. If the average reuse rate 610 of a pool $P_x$ 604 is less than the threshold 706, method 800 proceeds to 816. If the average reuse rate 610 of a pool $P_x$ 604 is greater than the threshold 706, method 800 proceeds to 818. This allows the system 100 to dynamically determine whether the buffer cache 108 should reuse memory of an existing page 204 from the same pool $P_x$ 604 or rebalance memory from a victim pool 502 to a depleted pool 504 early on in a reuse cycle.

At 816, the buffer cache 108 reuses memory from pool $P_x$ 604. To reuse memory, the buffer cache 108 may reuse the memory for the least recently used page 312 of the Least Recently Used List 302 to read a page 204 from the disk 114. The buffer cache 108 may evict the least recently used page 312 to the Free List 306. The buffer cache 108 may then read the new page 204 from the disk 114 into the LRU List 302. According to some embodiments, in cases where the Least Recently Used List 302 is very small or empty, the buffer cache 108 may evict a page from the Hot Buffer List 304 and read the new page into the Hot Buffer List 304. Method 800 may then proceed again to 802 to dynamically determine whether the buffer cache 108 should reuse memory of an existing page of a same pool $P_x$ 604 or rebalance memory from a victim pool 502 for subsequent time intervals $T_n$ 602.

At 818, the system 100 determines which pool 202 is the victim pool 504 for a new page 204 requested to be loaded. The victim pool 504 is the pool from which memory is allocated to the depleted pool 502. According to some embodiments, the victim pool is the pool with the minimum average reuse rate 610.

At 820, the system 100 determines how many pages 204 the buffer cache 108 should rebalance from the victim pool 504 to the depleted pool 502. The system 100 determines how many pages 204 of worth of memory in the depleted pool 504 needs to be rebalanced from one or more victim pools 502. The system 100 may multiply the number of pages 204 required for depleted pool 504 and the size of the depleted pool 504. The system 100 may divide this value from the size of the victim pool 502 to determine the number of pages 204 that need to be rebalanced from the victim pool 502 to the depleted pool 504. The system 100 can determine how many pages need to be rebalanced from the victim pool 502 to the depleted pool 504 based on the following formula:

$$\text{\# of Pages to be Rebalanced from Victim Pool} = \frac{\text{\# of Pages Required for Depleted Pool} * \text{Size of Depleted Pool}}{\text{Size of Victim Pool}}$$

According to some embodiments, the system 100 may also determine a page rebalance upper limit 508, which is a limit on how many pages 204 should be rebalanced from a victim pool 502. According to one embodiment, the page rebalance upper limit 508 can be determined by first calculating the least common multiple of the page size in the victim pool 502 and the page size in the depleted pool 504. The size of the buffer in the victim pool 502 can then be divided from the least common multiple of the page size in the victim pool 502 and the page size in the depleted pool 504. The page rebalance upper limit 508 can be determined using the following formula:

$$\text{Page Rebalance Upper Limit} = \frac{LCM(\text{Page Size of Victim Pool, Page Size of Depleted Pool})}{\text{Page Size of Victim Pool}}$$

At 822, the buffer cache 108 rebalances memory from the victim pool 504 to the depleted pool 502. To rebalance memory, the buffer cache 108 may evict a page from the Free List 306 of the victim pool 502 to the depleted pool 504. The buffer cache 108 may continue to allocate a page from the victim pool 502 to the depleted pool 504 from the Free List 306 until the Free List 306 is empty. Once the Free List 306 is empty, the buffer cache 108 may allocate the least recently used page 312 from the Least Recently Used List 302 of the victim pool 502. The buffer cache 108 may continue to allocate the least recently used page 312 from the Least Recently Used. List 302 until the least recently used list is empty. According to some embodiments, the buffer cache 108 allocates memory from the Least Recently Used List 302 of the victim pool 502 to the depleted pool 504 first.

The buffer cache 108 continues to rebalance memory from the victim pool 504 to depleted pool 502 until the buffer cache 108 has rebalanced the required number of pages for the victim pool 504 to grow in size, as determined at 820. According to some embodiments, the buffer cache 108 rebalances pages from the victim pool 504 to depleted pool 502 up to the page rebalance upper limit 508.

At 824, the system 100 determines whether the buffer cache 108 should rebalance memory from a subsequent victim pool 506. If the first victim pool 504 has rebalanced the required memory to the depleted pool 502, then method 800 proceeds to 802 to dynamically determine whether the buffer cache 108 should reuse or rebalance memory for a new time interval $T_n$ 602. If the first victim pool 502 has not rebalanced the required memory for a new page request to the depleted pool 504, then method 800 proceeds to 826 to determine the subsequent victim pool 506.

At 826, the system 100 determines the subsequent victim pool 506 from which memory will be rebalanced to the depleted pool 504. If the victim pool 502 is too small or empty or the buffer cache 108 has rebalanced memory up to the page rebalance upper limit 508, the buffer cache 108 may rebalance memory from a subsequent victim pool 506 until the required memory has been rebalanced to the depleted pool 504. The subsequent victim pool 506 is a victim pool 502 different from all the victim pools 502 from which the buffer cache 108 has rebalanced memory to the depleted pool 504 within one time interval $T_n$ 602. According to some embodiments, the subsequent victim pool 506 is a victim pool different from all the victim pools 504 from which the buffer cache 108 has rebalanced memory to the depleted pool 502 for more than one time interval $T_n$ 602.

The subsequent victim pool 506 may be the victim pool with the minimum average reuse rate 610 from the victim pools that have not already been used for rebalancing in one time interval $T_n$ 602, according to some embodiments. Once the system 100 determines the subsequent victim pool 506 from which memory will be rebalanced to the depleted pool 504, the method 800 proceeds to 820 to determine how many pages are required to rebalance the remaining memory required from the subsequent victim pool 506 to the depleted pool 504. The system 100 also determines the page rebalance upper limit 508 for the subsequent victim pool 506. Once the system 100 determines how many pages 204 are required to rebalance the remaining memory required to the depleted pool 502, the system 100 rebalances the determined number of pages from the subsequent victim pool 506 to the depleted pool 504. According to some embodiments, the system 100 rebalances the remaining memory from the subsequent victim pool 506 to the depleted pool 504 up to a page rebalance upper limit 508. Method 800 will continue to rebalance memory from subsequent victim pools 506 until the required memory is rebalanced from a victim pool 504 or subsequent victim pool 506 to depleted pool 504.

Various embodiments can be implemented, for example, using one or more computer systems, such as computer system 900 shown in FIG. 9. FIG. 9 is described with reference to FIGS. 1-8. Computer system 900 can be used, for example, to implement method 800 of FIG. 800. For example, computer system 900 can implement and execute a set of instructions comprising scanning a pool to determine statistics related to a reuse cycle, determining and comparing an average reuse rate 610 and threshold 706 for one or more pools $P_x$ 604 in the buffer cache 108, reusing memory from existing pages 204 of a pool $P_x$ 604, and rebalancing memory from a victim pool 502 or subsequent victim pool 506. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving a request to load a new page of memory from a disk in a buffer cache;
   scanning a plurality of pools comprising one or more pages of equal size in the buffer cache within one or more time intervals;
   determining one or more increments of a reuse rate for each of the plurality of pools sampled in the buffer cache within the one or more time intervals, wherein the one or more increments of the reuse rate is a counter of how many times pages were reused in a pool between a current time interval and a previous time interval;
determining one or more average reuse rates for each of the plurality of pools sampled in the buffer cache within the one or more time intervals, wherein an average reuse rate is a cumulative reuse rate divided by a number of time intervals in which one of the plurality of pools were sampled;
determining the average reuse rate of one or more of the plurality of pools is greater than a threshold in the current time interval, wherein the one or more pools of the plurality of pools for which the average reuse rate is greater than the threshold is a depleted pool; and
determining a first victim pool from which to rebalance memory to the depleted pool.

2. The method of claim 1, wherein the first victim pool is a pool with a minimum average reuse rate.

3. The method of claim 1, further comprising:
determining a number of pages the first victim pool will allocate to the depleted pool; and
rebalancing one or more pages of memory from the first victim pool to the depleted pool based on the determined number of pages.

4. The method of claim 1, wherein the buffer cache rebalances memory from the first victim pool to the depleted pool.

5. The method of claim 4, wherein the buffer cache evicts a page of the first victim pool to the depleted pool.

6. The method of claim 4, wherein the buffer cache rebalances pages from the first victim pool to the depleted pool up to a page rebalance upper limit.

7. The method of claim 1, further comprising:
determining a pool with a minimum average reuse rate within the current time interval is the first victim pool.

8. A system, comprising:
a memory; and
at least one processor coupled to the memory and configured to:
receive a request to load a new page of memory from a disk in a buffer cache;
scan a plurality of pools comprising one or more pages of equal size in the buffer cache within one or more time intervals;
determine one or more increments of a reuse rate for each of the plurality of pools sampled in the buffer cache within the one or more time intervals, wherein the one or more increments of the reuse rate is a counter of how many times pages were reused in a pool between a current time interval and a previous time interval;
determine one or more average reuse rates for each of the plurality of pools sampled in the buffer cache within the one or more time intervals, wherein an average reuse rate is a cumulative reuse rate divided by a number of time intervals in which one of the plurality of pools were sampled;
determine the average reuse rate of one or more of the plurality of pools is greater than a threshold in the current time interval, wherein the one or more pools of the plurality of pools for which the average reuse rate is greater than the threshold is a depleted pool; and
determine a first victim pool from which to rebalance memory to the depleted pool.

9. The system of claim 8, wherein the first victim pool is a pool with a minimum average reuse rate.

10. The system of claim 8, wherein the at least one processor is further configured to:
determine a number of pages the first victim pool will allocate to the depleted pool; and
rebalance one or more pages of memory from the first victim pool to the depleted pool based on the determined number of pages.

11. The system of claim 8, wherein the buffer cache rebalances memory from the first victim pool to the depleted pool.

12. The system of claim 11, wherein the buffer cache evicts a page of the first victim pool to the depleted pool.

13. The system of claim 11, wherein the buffer cache rebalances pages from the first victim pool to the depleted pool up to a page rebalance upper limit.

14. The system of claim 8, wherein the at least one processor is further configured to:
determine a pool with a minimum average reuse rate within the current time interval is the first victim pool.

15. A non-transitory computer-readable medium having instructions stored thereon that, when executed by at least one computing device, cause the at least one computing device to perform operations comprising:
receiving a request to load a new page of memory from a disk in a buffer cache;
scanning a plurality of pools comprising one or more pages of equal size in the buffer cache within one or more time intervals;
determining one or more increments of a reuse rate for each of the plurality of pools sampled in the buffer cache within the one or more time intervals, wherein the one or more increments of the reuse rate is a counter of how many times pages were reused in a pool between a current time interval and a previous time interval;
determining one or more average reuse rates for each of the plurality of pools sampled in the buffer cache within the one or more time intervals, wherein an average reuse rate is a cumulative reuse rate divided by a number of time intervals in which one of the plurality of pools were sampled;
determining the average reuse rate of one or more of the plurality of pools is greater than a threshold in the current time interval, wherein the one or more pools of the plurality of pools for which the average reuse rate is greater than the threshold is a depleted pool; and
determining a first victim pool from which to rebalance memory to the depleted pool.

16. The non-transitory computer-readable medium of claim 15, wherein the first victim pool is a pool with a minimum average reuse rate.

17. The non-transitory computer-readable medium of claim 15, the operations further comprising:
determining a number of pages the first victim pool will allocate to the depleted pool; and
rebalancing one or more pages of memory from the first victim pool to the depleted pool based on the determined number of pages.

18. The non-transitory computer-readable medium of claim 15, wherein the buffer cache rebalances memory from the first victim pool to the depleted pool.

19. The non-transitory computer-readable medium of claim 17, wherein the buffer cache rebalances pages from the first victim pool to the depleted pool up to a page rebalance upper limit.

20. The non-transitory computer-readable medium of claim 15, the operations further comprising:
   determining a pool with a minimum average reuse rate within the current time interval is the first victim pool.

* * * * *